United States Patent
Melson et al.

(10) Patent No.: US 11,595,436 B2
(45) Date of Patent: Feb. 28, 2023

(54) RULE-BASED DYNAMIC SECURITY TEST SYSTEM

(71) Applicant: Target Brands, Inc., Minneapolis, MN (US)

(72) Inventors: Paul Melson, Minneapolis, MN (US); Chris Carlson, Minneapolis, MN (US); Eric Brandel, Minneapolis, MN (US); Caleb Walch, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 146 days.

(21) Appl. No.: 17/157,468

(22) Filed: Jan. 25, 2021

(65) Prior Publication Data

US 2021/0314353 A1 Oct. 7, 2021

Related U.S. Application Data

(60) Provisional application No. 63/006,588, filed on Apr. 7, 2020.

(51) Int. Cl.
| | | |
|---|---|---|
| *H04L 29/06* | (2006.01) | |
| *H04L 9/40* | (2022.01) | |
| *H04L 67/02* | (2022.01) | |

(52) U.S. Cl.
CPC ...... *H04L 63/1483* (2013.01); *H04L 63/1416* (2013.01); *H04L 63/1433* (2013.01); *H04L 63/20* (2013.01); *H04L 67/02* (2013.01)

(58) Field of Classification Search
CPC . H04L 63/1483; H04L 63/1416; H04L 63/20; H04L 63/145; G06F 21/566; G06F 21/53; G06F 21/577
See application file for complete search history.

(56) References Cited

U.S. PATENT DOCUMENTS

| | | | |
|---|---|---|---|
| 7,063,263 | B2 | 6/2006 | Swartz et al. |
| 7,562,304 | B2 | 7/2009 | Dixon et al. |
| 8,689,333 | B2 | 4/2014 | Aziz |
| 8,881,282 | B1 | 11/2014 | Aziz et al. |
| 9,015,844 | B1 | 4/2015 | Franklin et al. |
| 9,306,660 | B2 | 4/2016 | Graube et al. |
| 9,398,031 | B1 | 7/2016 | Ranadive et al. |
| 9,436,763 | B1 | 9/2016 | Gianos et al. |
| 9,519,919 | B2 | 12/2016 | Chandra |
| 9,661,014 | B2 * | 5/2017 | Shafigullin ......... G06F 11/3688 |

(Continued)

FOREIGN PATENT DOCUMENTS

WO WO-2015142755 A1 * 9/2015 ........... G06F 21/562

OTHER PUBLICATIONS

P. Likarish, E. Jung and I. Jo, "Obfuscated malicious javascript detection using classification techniques," 2009 4th International Conference on Malicious and Unwanted Software (MALWARE), 2009, pp. 47-54, doi: 10.1109/MALWARE.2009.5403020. (Year: 2009).*

*Primary Examiner* — Chirag R Patel
(74) *Attorney, Agent, or Firm* — Fish & Richardson P.C.

(57) ABSTRACT

A website anomaly test is performed by automatically checking that a website has not been compromised by malicious code. A system can test a dynamic behavior of a website that indicates a functional user flow through the website. A set of rules are applied against a log of dynamic behavior of the website, as well as static code of the website, to identify potential compromise by malicious scripts.

19 Claims, 19 Drawing Sheets

(56) References Cited

U.S. PATENT DOCUMENTS

| | | | |
|---|---|---|---|
| 9,940,663 B2 | 4/2018 | Ward et al. | |
| 9,998,867 B2 | 6/2018 | Keithley | |
| 10,111,030 B2 | 10/2018 | Gedikian | |
| 11,314,862 B2* | 4/2022 | Sawhney | G06N 5/04 |
| 2009/0240571 A1 | 9/2009 | Bonner et al. | |
| 2011/0060652 A1 | 3/2011 | Morton | |
| 2011/0185428 A1* | 7/2011 | Sallam | G06F 21/566 |
| | | | 707/769 |
| 2011/0289582 A1* | 11/2011 | Kejriwal | H04L 63/14 |
| | | | 726/22 |
| 2014/0164122 A1 | 6/2014 | Wissner-Gross et al. | |
| 2015/0161715 A1 | 6/2015 | Rose | |
| 2015/0363598 A1* | 12/2015 | Xu | G06F 21/563 |
| | | | 726/23 |
| 2016/0148270 A1 | 5/2016 | Vigier et al. | |
| 2018/0349583 A1 | 12/2018 | Turgeman et al. | |
| 2019/0132355 A1* | 5/2019 | Egbert | H04L 63/1466 |
| 2020/0195664 A1* | 6/2020 | Castilho | H04L 63/1425 |

* cited by examiner

RULE-BASED DYNAMIC SECURITY TEST SYSTEM

CROSS-REFERENCE TO RELATED APPLICATIONS

This application claims the benefit of U.S. Provisional Application Ser. No. 63/006,588, Apr. 7, 2020. The disclosure of the prior application is considered part of (and is incorporated by reference in) the disclosure of this application.

TECHNICAL FIELD

This document generally describes technologies for a network security test of a network resource, such as websites.

BACKGROUND

A website vulnerability is a weakness or misconfiguration in website code that allows an attacker to breach one or more security mechanisms on the site, which can permit attackers to, for example, gain some level of control over or access to sensitive information on the site. There are several types of well-known website vulnerabilities that have been exploited by attackers, such as SQL injection vulnerabilities, cross-site scripting (XSS), command injection, file inclusion, and cross-site request forgery (CSRF). SQL injection vulnerabilities refer to areas in website code where direct input from a client device can be passed to a database. Bad actors utilize these forms to inject malicious code into a website's database, such as by injecting malicious/spam posts into a site, stealing customer information, or bypassing authentication to gain full control of the website. XSS occurs when attackers inject scripts through unsanitized user input or other fields on a website to execute code on the site. Browsers are unable to discern whether or not such cross-site scripts are intended to be part of the website, resulting in malicious actions being performed by cross-site scripts, such as session hijacking, spam content being distributed to unsuspecting visitors, and stealing session data. Command injection vulnerabilities allow attackers to remotely pass and execute code on the website's hosting server. File inclusion attacks use inclusion functions in server-side web application languages (e.g., PHP) to execute code from a remotely stored malicious file. CSRF attacks trick site users or administrators to unknowingly perform malicious actions for the attacker, such as changing order values and product prices, transferring funds from one account to another, or changing user passwords to hijack accounts.

Website administrators may manually analyze website code to identify vulnerabilities. For example, a website crawl and audit may be manually or automatically used to discover vulnerabilities by, for example, working statically with each link interacting with a server.

SUMMARY

The present disclosure relates to systems, methods, devices, and computer program products for network security tests, such as tests on website vulnerability (e.g., website anomaly due to potentially malicious code). For example, the technologies described herein provide a system for automatically checking and detecting whether a website has been compromised by malicious third party scripts (and/or other types of scripts as described herein) based on a set of rules. The rules are predetermined and can be applied against a static code of the website, and further against a log generated by dynamic real-time testing of a website (e.g., detecting a functional user flow through a website), to expose vulnerabilities from third party scripts that have been secretly injected into trusted libraries on the website. In some implementations, website code can be loaded and evaluated in a runtime testing environment on a client computing device, which can simulate user processes on the website, such as potentially sensitive functional user flows like purchasing items in an online store, logging in to a user account, and accessing private account information. Such a runtime testing environment can capture and record the dynamic behavior of the website during these functional user flows on the website, and apply rules against the record of dynamic behavior of the website to detect the potential presence of malicious third party scripts.

The technologies herein provide a variety of different rules and checks that are performed by a network security test system to determine whether a potential security anomaly exists. In some implementations, the network security test system can automatically test websites in their runtime environments (e.g., as loaded and interpreted on client computing devices) for the presence of malicious third party scripts, with the goal being to provide a security check that either validates the website as secure or prompts an investigation into the potential security anomaly. The network security test system can dynamically test a website in its runtime environment and monitors operations that are performed as part of the website while a functional user flow is performed on the website, such as an automated checkout process in an online store. Such dynamic tests can reveal vulnerabilities in a website that would not be apparent from static analysis. For example, the system can generate and run automation scripts on the website to simulate user interactions with the website (e.g., login, checkout process with payment information, etc.). The system can run the test without modifying the website codes by copying the codes and executing them with the automation scripts in an isolated environment. As the automation scripts are run on the website, the system can log the behavior of the website.

Some embodiments of the network security test system can apply a set of rules against the website being dynamically scanned and logged, and/or against the static code of the website, and identify any malicious indicators and determine whether a potential security anomaly exists. For example, the rules can be configured to examine website code itself by detecting indicators (e.g., strings or code snippets) in the website code that represent presence of obfuscation techniques, encryption libraries, masking techniques, and sensitive information requests in the website code. Such presence can indicate that malicious scripts are likely included in the website code, and further investigation may be required. In addition or alternatively, the rules can be configured to examine the dynamic behavior log, which is created during the dynamic website test in runtime environments, by looking at network traffic in the log and searching for known bad actors (e.g., scripts, domains, etc.) and/or unknown actors (e.g., scripts, domains, etc.) that have interacted with the website. Presence of known bad actors or unknown actors can be used as indicators for presence of malicious scripts, for which further investigation may be needed. In addition or alternatively, the rules can be configured to examine the dynamic behavior log by detecting indicators that can represent whether sensitive information (e.g., payment data, credentials, etc.) is requested and transmitted outside the website (e.g., to bad domains), whether content security policies (e.g., security policies implemented in browsers) are bypassed, whether information entered in sensitive information fields is intercepted, and/or whether script behavior is modified in the website when the website is being observed. Presence of such indicators from the dynamic behavior log can be used as indicators for presence of malicious scripts, for which further investigation may be needed.

In addition, the technologies described herein can also be used to automatically check and detect whether a website has been compromised by other types of malicious scripts such as inline scripts and first party scripts. For example, inline scripts includes scripts written in an <script> block within the webpage that is loaded. First party scripts include scripts that are included in separate files (e.g., .js files) and located on the same domain name as the webpage. Third party scripts include scripts that are included in separate files (e.g., .js files) and located on another domain.

For example, malicious first party scripts can appear on a website in various scenarios, and the technologies described herein can dynamically test and identify such malicious first party scripts in the same or similar manner as they do for malicious third party scripts. In one scenario, malicious first party scripts can appear on a target website through supply chain attacks. For example, an attacker compromises a script that can be used on sensitive pages (e.g., checkout page). The compromised script may be added to various online repositories (e.g., Npm™, Bower™, etc.), and pulled into a build process for the website automatically. In another scenario, a malicious first party script can appear on a website if an external entity has compromised the system that manages the website. For example, a malicious code may be placed directly onto the website, thereby ending up being a first party script. In yet another scenario, a malicious code may be added to the website by a malicious insider.

Particular embodiments described herein include a method for testing a website anomaly. The method may include retrieving website code of a website, the website code including a script; executing the website code with automation script, the automation script simulating a user interaction with the website; monitoring a dynamic behavior of the website including a functional user flow through the website based on a simulated user interaction; generating a log of the dynamic behavior; applying a set of rules to evaluate the website code including the script, evaluate source and destination information in the log of the dynamic behavior, and evaluate website behavior in the log of the dynamic behavior; and determining presence of a potential malicious script based on the evaluation.

In some implementations, the method can optionally include one or more of the following features. Evaluating code in the log of the dynamic behavior may include applying an encryption rule against the website code; applying an obfuscation rule against the website code; applying a mask rule against the website code; and applying a sensitive information request rule against the website code. Evaluating source and destination information may include applying a known bad actors rule against the log of the dynamic behavior; and applying an unknown actors rule against the log of the dynamic behavior. Evaluating website behavior may include applying a sensitive information transmission rule against the log of the dynamic behavior; applying a content security policy bypass rule against the log of the dynamic behavior; applying a sensitive field event access rule against the log of the dynamic behavior; and applying a script modification rule against the log of the dynamic behavior. Applying an encryption rule against the website code may include accessing a list of encryption indicators; accessing the website code; searching for one or more indicators in the website code that matches any of the encryption indicators in the list; and upon determining that at least one indicator is present in the website code that matches any of the encryption indicators in the list, returning an alert of presence of a potential malicious script in the website. Applying an obfuscation rule against the website code may include accessing a list of obfuscation indicators; accessing the website code; searching for one or more indicators in the website code that matches any of the obfuscation indicators in the list; and upon determining that at least one indicator is present in the website code that matches any of the obfuscation indicators in the list, returning an alert of presence of a potential malicious script in the website. Applying a mask rule against the website code may include accessing a list of mask indicators; accessing the website code; searching for one or more indicators in the website code that matches any of the mask indicators in the list; and upon determining that at least one indicator is present in the website code that matches any of the mask indicators in the list, returning an alert of presence of a potential malicious script in the website. Applying a sensitive information request rule against the website code may include accessing the website code; searching for one or more requests attempting to transmit sensitive information outside the website; and upon determining that at least one request is present in the website code that attempts to transmit the sensitive information outside the website, returning an alert of presence of a potential malicious script in the website. The sensitive information may include at least one of login credentials, email addresses, biometric elements, elements for multi-factor authentication, payment information. Applying a known bad actors rule against the log of the dynamic behavior may include accessing a list of known bad actors; accessing the log of the dynamic behavior; searching for one or more known bad actors in the log; and upon determining that at least one known bad actor is present in the log, returning an alert of presence of a potential malicious script in the website. Applying an unknown actors rule against the log of the dynamic behavior may include accessing a list of known actors; accessing the log of the dynamic behavior; searching for one or more unknown actors in the log, the unknown actors including actors not included in the list of known actors; and upon determining that at least one unknown actor is present in the log, returning an alert of presence of a potential malicious script in the website. Applying a sensitive information transmission rule against the log of the dynamic behavior may include accessing the log of the dynamic behavior; accessing sensitive information inputted to sensitive fields of the website; accessing network traffic in the log; searching for one or more requests containing information in the network traffic, the information matching the sensitive information inputted to the sensitive fields; and upon determining that at least one request is present in the network traffic and contains information that matches the sensitive information, returning an alert of presence of a potential malicious script in the website. Applying a content security policy bypass rule against the log of the dynamic behavior may include accessing the log of the dynamic behaviors; accessing content security policy bypass patterns; accessing network traffic in the log; searching for one or more activities or attempts for bypassing content security policy in the network traffic that matches any of the content security policy bypass patterns; and upon determining that at least one activity or attempt for bypassing content security policy is present in the network traffic and matches any of the content security policy bypass patterns, returning an alert of presence of a potential malicious script in the website. Applying a sensitive field event access rule against the log of the dynamic behavior may include accessing indicators of sensitive information fields; accessing the log of the dynamic behavior; determining a number of binding events for each of the sensitive information fields; determining that the number of binding events is different from a baseline value; and returning an alert of presence of a potential malicious script in the website. Applying a sensitive field event access rule against the log of the dynamic behavior may include accessing indicators of sensitive information fields; accessing the log of the dynamic behavior; determining a number of binding events for each of the sensitive information fields in each of a plurality of runs of the website; determining that the number of binding events varies across the plurality of runs of the website; and returning an alert of presence of a potential malicious script in the website. Applying a script modification rule against the log of the dynamic behavior may include accessing indicators of script behavior modification when the website is observed; accessing the log of the dynamic behavior; searching for one or more indicators in the log that match any of the indicators of script behavior modification; and upon determining that at least one indicator is present in the log and matches any of the indicators of script behavior modification, returning an alert of presence of a potential malicious script in the website. Executing the website code may include hooking a plurality of attributes in runtime of the website. The plurality of attributes may include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic.

Particular embodiments described herein include a client computing device for testing a website security anomaly. The device may include a data processing apparatus and a memory device storing instructions that when executed by the data processing apparatus cause the device to perform operations comprising: retrieving website code of a website, the website code including a script; executing the website code with automation script, the automation script simulating a user interaction with the website; monitoring a dynamic behavior of the website including a functional user flow through the website based on a simulated user interaction; generating a log of the dynamic behavior; applying a set of rules to evaluate the website code including the script, evaluate source and destination information in the log of the dynamic behavior, and evaluate website behavior in the log of the dynamic behavior; and determining presence of a potential malicious script based on the evaluation.

Particular embodiments described herein include a non-transitory computer-readable medium having stored therein a program for causing a computer to execute a process of testing a website security anomaly. The process may include receiving a user input of a URL of a website; transmitting the URL to a web server to retrieve website code of the website; receiving website code of the website from the web server, the website code including a third party script; receiving the third party script from a third party script server different from the web server; executing the website code with automation script; generating simulated user inputs based on the automation script; monitoring a dynamic behavior of the website interacting with the simulated user inputs; generating a log of the dynamic behavior; and applying a set of rules to evaluate the website code including the script, evaluate source and destination information in the log of the dynamic behavior, evaluate website behavior in the log of the dynamic behavior; and determining presence of a potential malicious script based on the evaluation.

The devices, system, and techniques described herein may provide one or more of the following advantages. For example, some embodiments described herein include a system that automates dynamic testing of a functional user flow through a website (e.g., a checkout page) to expose potentially malicious code from third party scripts or other types of scripts. Therefore, the system can reveal any suspicious behavior on a website resulting from malicious scripts that have been secretly injected into trusted libraries on the website in a way that is not apparent from static analysis (e.g., due to obfuscation of the third party scripts). Such identification of malicious third party scripts affecting a website may otherwise not be possible, and may be a point of uncertainty for website owners and managers regarding website security. The disclosed technology can assist in verifying that a website is free of such malicious third party scripts, and can also aid in detecting and neutralizing potential threat vectors when they exist.

In another example, the network security system can permit for automation scripts to be generated and run with website code in an isolated environment. Further, such automation scripts can simulate dynamic behavior of the website as if a user interacts with checkout page or other secured pages on the website. Therefore, security analysis of a website can be performed without affecting actual client devices that interact with the website.

In another example, the system herein can log the dynamic behavior of the website, and generate a report that can be used to identify any potentially malicious code on the website. The log can be used as a reliable source to identify any anomalies in the behavior of the website that can result from malicious third party scripts on the website. The reports can be used for further investigation of any identified anomalies.

In another example, the system herein can perform further attribution against scripts (e.g., first party scripts, third party scripts, etc.) by analyzing the log data. Some examples of behavior captured in the logs include dynamically loading additional scripts, adding third-party trackers, listening and recording keyboard events, adding or modifying elements on the webpage, and creating HTML elements that make network requests to third-party servers.

In another example, the static website code and/or the log of website dynamic behavior are examined based on a variety of rules that are simple to execute. The rules are configured to screen potential malicious actors quickly, thereby enabling further manual or automated security investigation to be performed with more focused approach and in time and cost efficient manners.

In another example, the example rules described herein may be implemented in a well-known programming language, in order to take advantage of the expressiveness and standards provided by this approach.

In another example, the example rules described herein can be updated on the fly for rapid response to the emergence of new threats by the usage of a user interface to enable creation and edit of the rules.

In another example, the example rules described herein can be updated programmatically via integrations with other network monitoring systems that can then feed new known threats automatically to the rules running in the system.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

In general, the technologies described herein provide systems, methods, devices, and computer program products for network security tests, such as website vulnerability tests for, e.g., website anomaly due to potentially malicious code. For example, the technologies described herein provide a system for automatically checking and detecting whether a website has been compromised based on a set of rules. The rules are predetermined and can be applied against the static code of the website, and further against a log (including the network traffic) generated by dynamic real-time testing of a website (e.g., detecting a functional user flow through a website), to expose potentially malicious code from third party scripts (and/or other types of scripts, such as first party scripts) that have been secretly injected into trusted libraries on the website. Although the technologies are described herein primarily with examples of third party scripts, it is understood that the technologies can be applied in the same or similar manners to other types of scripts such as first party scripts which may contain malicious code.

Figure 1:
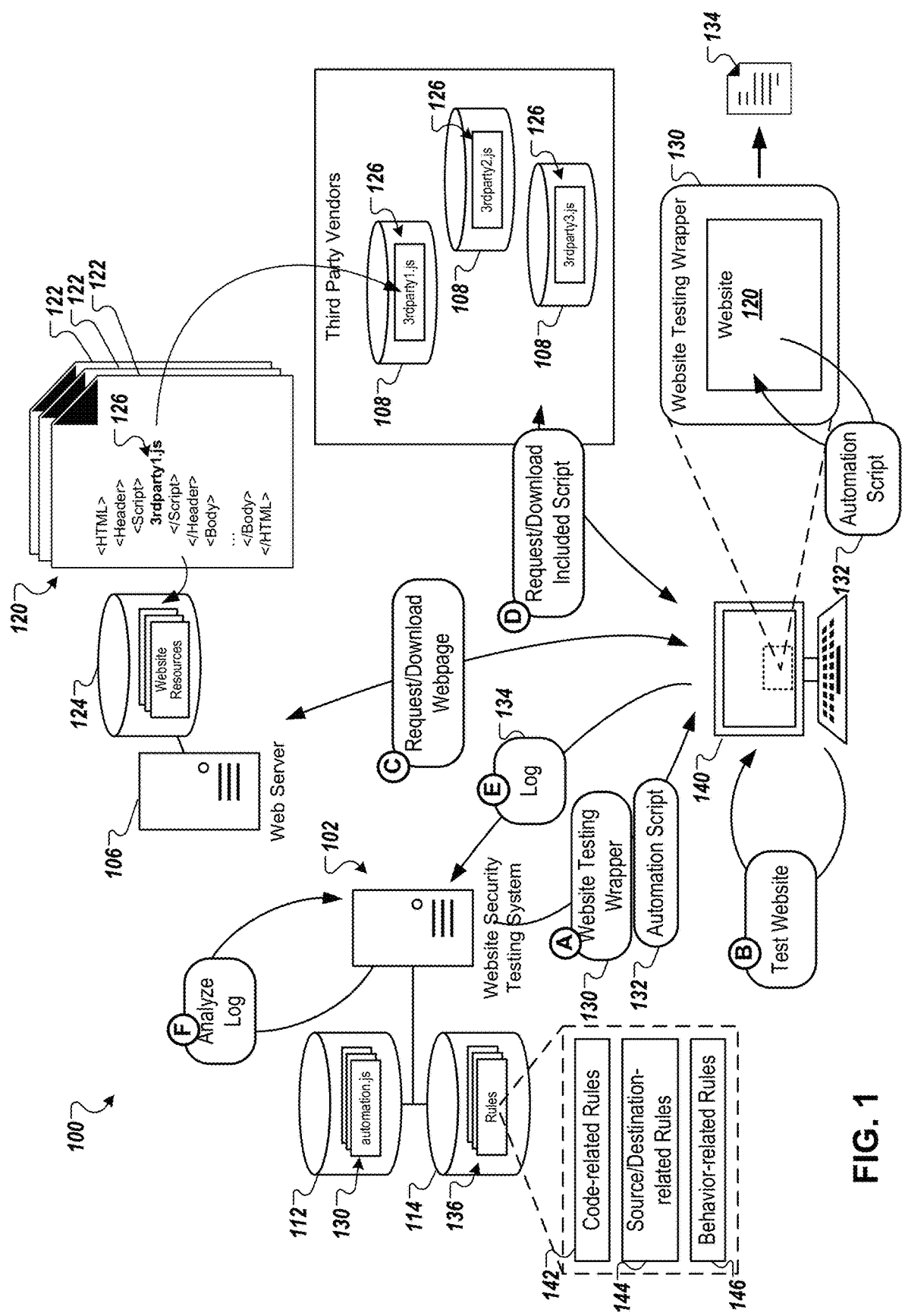
FIG. 1 is a block diagram of an example network architecture for website vulnerability testing.

FIG. 1 is a block diagram of an example network architecture 100 for website vulnerability testing of the present disclosure. The network architecture 100 includes a website security test system 102, a test client device 104, a web server 106, and a third party script server 108. The entities in the network architecture 100, such as the website security test system 102, the test client device 104, the web server 106, and the third party script server 108, are communicatively coupled to one or more networks.

The website security test system 102 stores and manages a website test tool, such as a website testing wrapper 130. The website security test system 102 can transmit the website test tool to the test client device 104 for anomaly testing as described herein. The website security test system 102 can manage a plurality of automation scripts that are stored in an automation scripts database 112. In addition, the website security test system 102 can manage one or more security testing rules 136 stored in a testing rules database 114. Testing rules can be used to analyze static website code (e.g., website source code), and/or records of dynamic behavior of websites, and determine any malicious code detected.

The test client device 104 is used to access a website (e.g., one or more webpages thereof) from the web server 106 and perform tests of the website. The test client device 104 can be dedicated for security anomaly testing for websites. For example, the test client device 104 can be a computing device only for the website security testing described herein, and is not an actual client device in the network (e.g., a network client or host). In alternative implementations, an actual network client device can be used as the test client device 104. The test client device 104 can provide an isolated environment for such testing. The test client device 104 can be a physical computing device, a virtual machine, or any other systems that can provide isolated runtime environments for websites.

The test client device 104 can run a web browser for a user to access the website being tested. In addition or alternatively, the test client device 104 executes a website testing tool (e.g., the website testing wrapper) to perform anomaly testing on the website.

The web server 106 operates to host one or more webpages 122 of a website 120. The web server 106 connects to a website resources database 124 storing code (e.g., HTML, scripts (e.g., JavaScript), style sheets, server-side code, client-side code, etc.) that the web server 106 executes and/or distributes to provide the webpages 122 on client devices. The webpages 122 can be considered to collectively be a website 120 that is hosted by the web server 106.

A website is a collection of network web resources, such as static assets (images, fonts, embedded videos, HTML, JavaScript, style-sheets, etc.), and server-side code which are typically identified with a common domain name and published on a web server. A website can be of various types, such as a static website and a dynamic website (also referred to as a web application). A static website has web pages stored on the server in the format that is sent to a client web browser. It may be coded in Hypertext Markup Language (HTML) and Cascading Style Sheets (CSS) used to control appearance beyond basic HTML. Images are commonly used to affect the desired appearance and as part of the main content. Audio or video might also be considered static content if it plays automatically or is generally non-interactive. This type of website usually displays the same information to all visitors. A dynamic website (or a web application) is a website that changes or customizes itself frequently and automatically. Server-side dynamic pages are generated on the fly by computer code that produces the HTML with CSS. There are a wide range of software systems, such as CGI, Java Servlets and Java Server Pages (JSP), Active Server Pages, Node.js, and ColdFusion (CFML), which are available to generate dynamic web systems and dynamic sites.

By way of example, an example of a website to be tested for the presence of malicious code may be an online shopping website in which a user connects to the website through a web browser, and save shopping items in a shopping cart, sign in the user's account by entering a username/password combination, and/or check out with payment. The automation script, when executed, can simulate such user interaction with the website.

The third party script server 108 operates to host one or more third party scripts 126 that can be included in a website 120. The third party script server 108 can be separate from the web server 106 and provide scripts to be directly embedded to the website hosted by the web server 106.

Third party scripts 126 are scripts (e.g., JavaScript) that can be embedded into a website directly from third-party vendors. Third party scripts 126 may provide a range of functionalities that make a website more dynamic and interactive, and/or generate a revenue stream. Such scripts can include ads, analytics, widgets and other suitable scripts for other functionalities. Examples of third-party scripts include social sharing buttons (e.g., Twitter, Facebook, G+, etc.), video player embeds (e.g., YouTube, Vimeo, etc.), advertising iframes, analytics & metrics scripts, AB testing scripts for experiments, helper libraries (e.g., date formatting, animation, functional libraries, etc.).

By way of example, where a website is an online shopping website including login, checkout, payment, and other sensitive processes, many third party scripts can be downloaded and run with the website code. As described herein, malicious code can be injected into the source code. For example, third party scripts for payment process can be compromised with malicious code for scrapping user's sensitive data (e.g., credit card information) by listening to user's keystrokes. In addition or alternatively, attackers can create malicious scripts and inject them into the website directly. Numerous third party scripts can be embedded in website code in such a way that they look like part of normal website code without revealing any overtly malicious intent. Therefore, static code analysis does not identify all of such scripts until the scripts are actually executed on client devices. As described herein, dynamic analysis described herein can monitor and log the behavior of a website with third party scripts embedded therein when the website is run through a web browser (and/or the website testing wrapper) on a client device.

Referring still to FIG. 1, an overall process for dynamic testing of websites for anomalies is described. In Step A, the website security testing system 102 can transmit a website testing wrapper 130 and an automation script 132 to the test client device 104 so that anomaly testing can be performed for a website 120 that has been identified to be tested for the presence of anomalous code.

The website testing wrapper 130 is code designed to test a website in the test client device 104 with no or little modification of the website code. As described herein, the website testing wrapper 130 can execute the automation script 132 on the website code, and generate a dynamic website log 134 that indicate the behavior of the website in response to the automation script.

The automation script 132 is a script that automatically simulates a series of actions or inputs of a user that interact with a target website. The automation script can include operation of elements of the target website, modification of attributes of the elements, changes to the location of the elements in a document object model (DOM), and any other suitable actions against the target webpage. Such elements can be based on events that result from user interaction with a web browser. In some implementations, the automation script 132 can be derived from a functional test script to test for the presence of anomalous code.

The automation script 132, which is suitable for testing the target website 120, can be selected and retrieved from a plurality of automation scripts stored in the database 112. Alternatively, the automation script 132 can be created and/or formatted to be executable with the website 120 on the test client device 104.

In Step B, the test client device 104 operates to test the website 120, which causes the test client device 104 to request and download the webpages (Step C), and further to request and download the third party scripts and resources included in the webpages (Step D).

In Step C, the test client device 104 transmits a request for the website 120 to the web server 106. The web server 106 transmits the requested website 120 to the test client device 104, and the test client device 104 downloads the website 120 (e.g., webpages 122 thereof) from the web server 106.

In Step D, the test client device 104 transmits a request for the third party scripts 126 included in the webpages 122 to the third party script servers 108, which then transmits the requested third party scripts 126 back to the test client device 104. The test client device 104 downloads the third party scripts 126 from the third party script servers 108.

During the testing process (Step B), the webpages 122 including the third party scripts 126 can be accessed and presented with the website test wrapper 130, which can execute the automation script 132. The automation script 132 provides simulated user inputs to interact with the webpages 122. The website test wrapper 130 can generate a dynamic website log 134 that records all the behavior of the webpages 122 in response to the simulated user inputs provided by the automation script 132.

In Step E, the test client device 104 transmits the log 134 to the website security testing system 102. The log 134 can include various pieces of information indicative of a dynamic behavior of the webpages 122, which includes a functional user flow through the webpages resulting from the simulated user interaction with the webpages 122. For example, the log 134 can include information about function calls, messages, events, network traffic, data packets, cookies, downloads, and other data indicative of the website behavior.

In Step F, the website security testing system 102 can be used to analyze the log 134 to identify any malicious behavior of the website 120. The website security testing system 102 can automatically scan and analyze the log 134, and identify any abnormal or malicious behavior and/or compromised source code. Alternatively or in addition, a security administrator (e.g., a security analyst) can manually review the log 134, and identify any abnormal or malicious behavior of the website 120 and/or determine if any of the source code has been compromised. In addition to analyzing the log 134, the website security testing system 102 can analyze the code (e.g., static code) of the website 120 (e.g., the code stored in the database 124).

In some implementations, the identification of anomalous behavior and/or compromised scripts can be performed based on one or more testing rules 114. The testing rules 114 can be designed to identify abnormal or suspicious code (e.g., scripts) in a website, and detect behavior of the website that differs from a predetermined sequence of a behavior of a website that interacts with a normal user input. In some implementations, the rules 114 include code-related rules 142, source/destination-related rules 144, and behavior-related rules 146. For example, presence of a potential malicious script can be determined by applying the code-related rules 142 against the code of the website 120, applying the source/destination-related rules 144 against the log 134, and/or applying the behavior-related rules 146 against the log 134.

The code-related rules 142 can be applied against static code of the website and configured to search for indicators (e.g., strings or code snippets) of malicious actors in the website code. For example, the code-related rules 142 can be used to identify indicators representative of presence of obfuscation techniques, encryption libraries, masking techniques (e.g., jQuery Mask), and sensitive information requests in the website code.

The source/destination-related rules 144 can be applied against the log 134 and configured to search for known bad actors and/or unknown actors that interact with the website in network traffic recorded in the log 134. Presence of known bad actors or unknown actors can be used as indicators for presence of malicious scripts, for which further investigation may be needed.

The behavior-related rules 146 can be applied against the log 134 and configured to search for indicators that can represent whether sensitive information (e.g., payment data, credentials, etc.) is requested and transmitted outside the website (e.g., to bad domains), whether content security policies (e.g., security policies implemented in browsers) are bypassed, whether information entered in sensitive information fields is intercepted, and/or whether script behavior is modified in the website when the website is being observed. Presence of such indicators identified from the log 134 can be used as indicators for presence of malicious scripts, for which further investigation may be needed.

Figure 2:
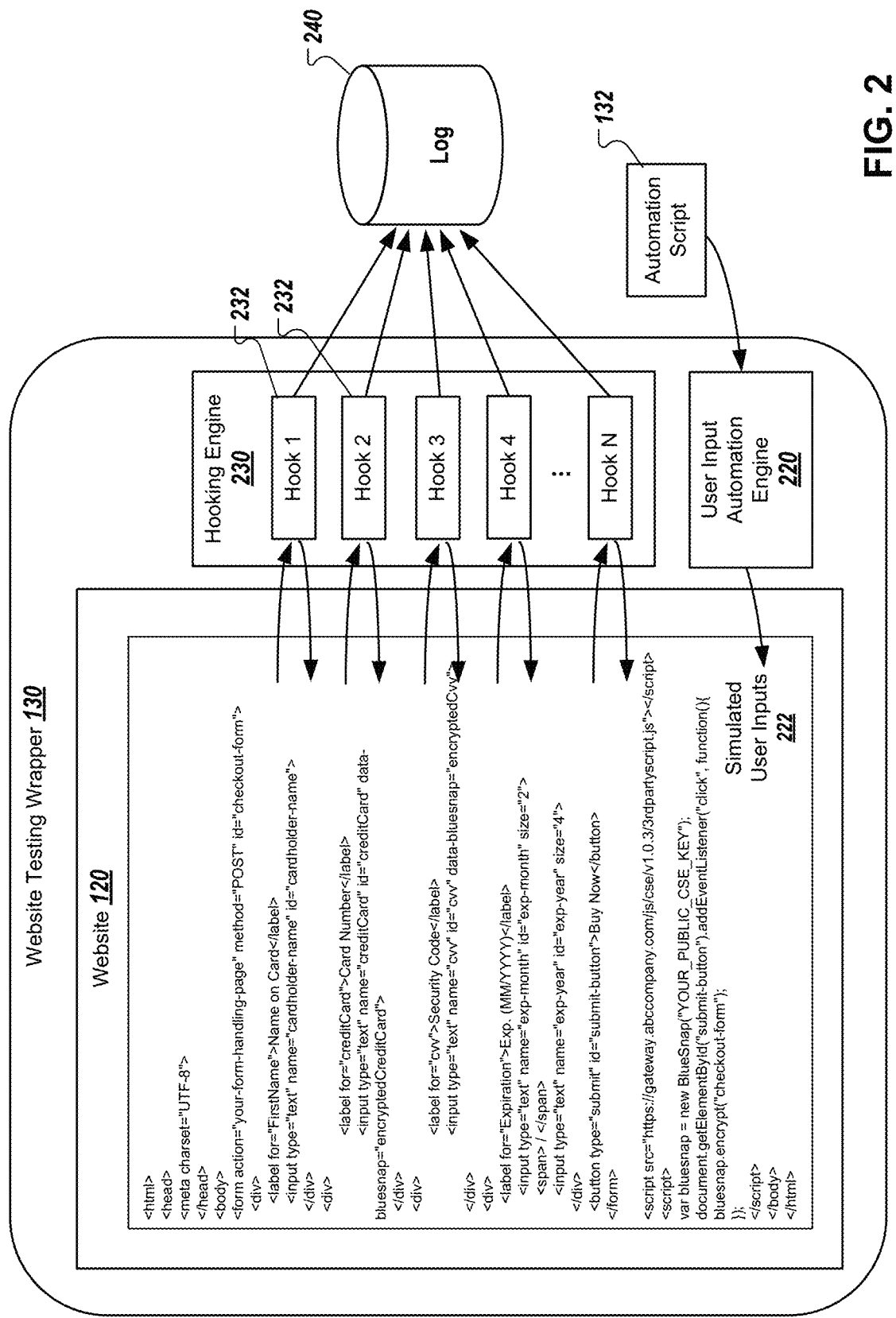
FIG. 2 illustrates an example method of performing dynamic security test of a webpage.

FIG. 2 illustrates an example method 200 of performing dynamic security test of a webpage 210. A webpage 210 can be one of the webpages 122 of the website 120 described in FIG. 1. The webpage 210 can be retrieved from a web server (e.g., the web server 106) and tested in the website testing wrapper 130.

The website testing wrapper 130 can include a user input automation engine 220 configured to simulate user inputs to the webpage 210. For example, the user input automation engine 220 can generate simulated user inputs 222 based on the automation script 132, and enable the simulated user inputs 222 to interact with the webpage 210.

The website testing wrapper 130 can monitor the dynamic behavior of the webpage 210. The dynamic behavior of the webpage 210 can include information indicative of a functional flow in response to the simulated user inputs 222. In some implementations, the website testing wrapper 130 can include a hooking engine 230 configured to monitor the behavior of the webpage being tested. For example, the hooking engine 230 is configured to intercept various operations performed in runtime of the webpage, which can include functional aspects of the webpage, such as function calls, messages, events, etc. that occur in the runtime of the webpage. The hooking engine 230 includes one or more hooks 232. Hooks 232 are code that handle such intercepted aspects (e.g., function calls, messages, events, etc.).

The hooking engine 230 of the website testing wrapper 130 can generate log data 240 that record the monitored behavior of the webpage 210. The log data 240 can be the dynamic website log 134 in FIG. 1. The log data 240 can be used to identify any anomalies in the behavior of the webpage that may result from malicious third party scripts embedded in the webpage.

Figure 3:
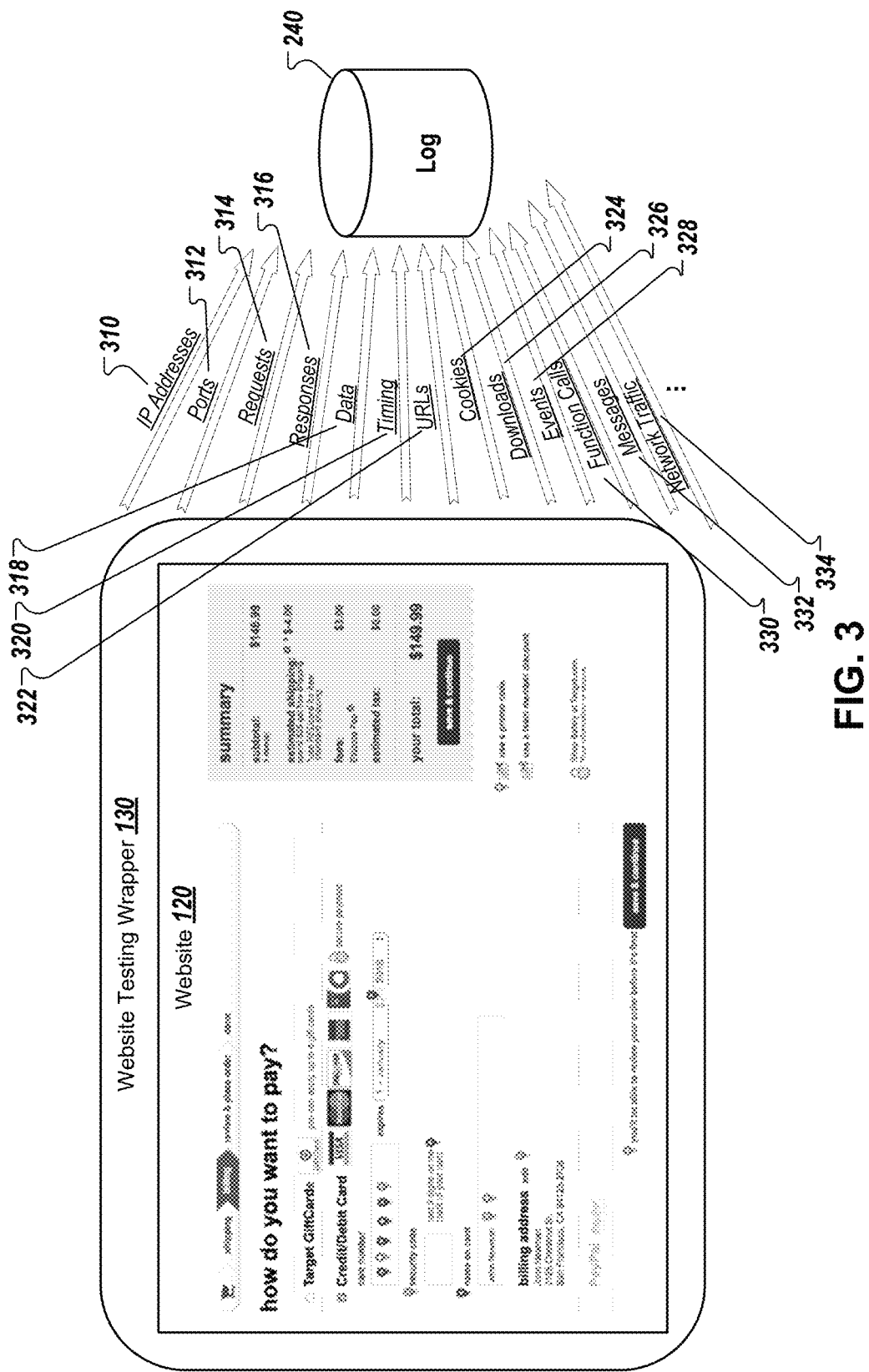
FIG. 3 illustrates example attributes that represent the dynamic behavior of a webpage being tested and is recorded as log data.

FIG. 3 illustrates example attributes that represent the dynamic behavior of a webpage being tested, and is recorded as log data 240. The log data 240 can be used as a source to identify any anomalies in the behavior of the website that can result from malicious third party scripts on the website. The log data 240 can be used to generate a report with which security administrators (e.g., security analysts) can further investigate and mitigate vulnerabilities of the website.

Various attributes can be obtained from the runtime test of the website described herein. Examples of such information include IP addresses 310 being redirected, ports 312 accessed, ongoing requests 314, server responses 316, data packets 318 being transmitted, timing 320 of the transmission, URLs 322 of various resources to/from which requests/responses/data are transmitted, cookies 324, and downloads 326, other events 328 occurring as a result of executing the website, function calls 330, messages 332, network traffic 334, and other pieces of information are monitored during the runtime test of the website.

A network traffic can be monitored by measuring various attributes of traffic, such as amount of traffic, type of traffic (e.g., web traffic, mail traffic, file transfer traffic, infrastructure traffic, remote control traffic, etc.), IP addresses (e.g., IP addresses of network devices, servers, clients, applications, etc.), ports accessed, protocols, bandwidth, etc. A network traffic can be analyzed by a packet sniffer. A packet sniffer intercepts and logs traffic passing over a network by capturing each packet.

A data packet is a formatted unit of data being transmitted to a network. A data packet includes payload and control information which provides data (e.g., source and destination network addresses, error detection codes, and sequencing information) for delivering the payload. Control information can be found in packet headers and trailers.

A cookie is a small piece of data sent from the website and stored on a user's computing device (e.g., the test client device) by the web browser while the user is browsing. Cookies are designed to permit for websites to remember stateful information (e.g., items added in the shopping cart in an online store) and/or to record the user's browsing activity (e.g., clicking buttons, logging in, recording visited pages, etc.). Cookies can further be used to record arbitrary pieces of information that the user has previously entered into form fields, such as names, addresses, passwords, and credit card numbers.

Cookies have various types, such as session cookies, persistent cookies, secure cookies, http-only cookies, same-site cookies, third-party cookies, supercookies, etc. Further, authentication cookies are cookies used by web servers to know whether the user is logged in or not, and which account they are logged in with. Authentication cookies allow the site to know whether to send a page containing sensitive information, or require the user to authenticate themselves by logging in. The security of an authentication cookie generally depends on the security of the issuing website and the user's web browser, and on whether the cookie data is encrypted. Security vulnerabilities may allow cookie's data to be read by a hacker, used to gain access to user data, or used to gain access (with the user's credentials) to the website to which the cookie belongs. Tracking cookies, such as third-party tracking cookies, are used as ways to compile long-term records of individuals' browsing histories.

Messages can include inputs generated by a system (e.g., an operating system on the test client device 104) and applications (e.g., a web browser launching the website being tested). A system can also generate messages in response to changes in the system brought about by an application. Further, a system can use messages to control the operations of applications and to provide input and other information for applications to process. An application can generate messages to perform tasks or communicate with other applications.

An event is an action or occurrence that may originate asynchronously from an external activity that needs to be handled by a program. An event is an entity which encapsulate the action and the contextual variables triggering the action. Events can be generated or triggered by a system, by a user, or in other ways. Events can be handled synchronously with a program flow. For example, the software may have one or more dedicated places where events are handled, frequently an event loop. A source of events (e.g., external activity) includes a user who may interact with the software by way of, for example, keystrokes on the keyboard. Another source is a hardware device such as a timer. Software can also trigger its own set of events into the event loop to, for example, communicate the completion of a task.

The events include user generated events, such as mouse events, keyboard events, joystick events, touchscreen events, and device events. For example, a pointing device can generate software recognizable pointing device gestures. A mouse can generate a number of mouse events, such as mouse move (e.g., direction of move and distance), mouse button controls, mouse wheel motion, or any combination thereof. Further, pressing a key, or a combination of multiple keys, on a keyboard generates a keyboard event which causes a currently running program to respond to data introduced by the keystroke. Moving a joystick generates an X-Y analogue signal which generates a joystick event. A joystick can have one or more buttons which also generate an event when pressed. A user interaction with a touchscreen can generate events which are referred to as touch events or gestures. Action by or to a device, such as a shake, tilt, rotation, move, etc., can generate device events.

Figure 4A:
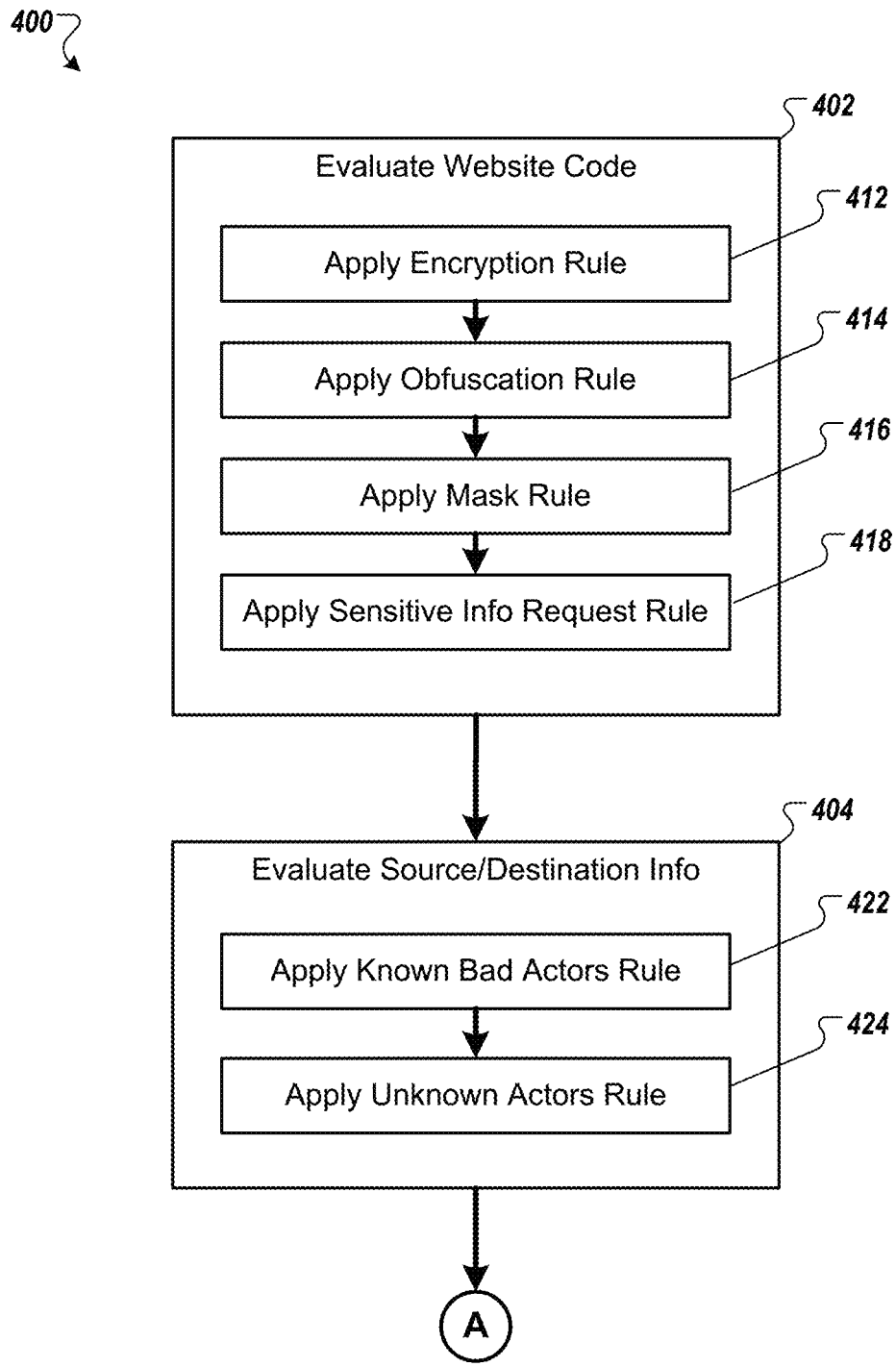
FIGS. 4A-B is a flowchart of an example process for identifying presence of a potentially-malicious script in a website.
Figure 4B:
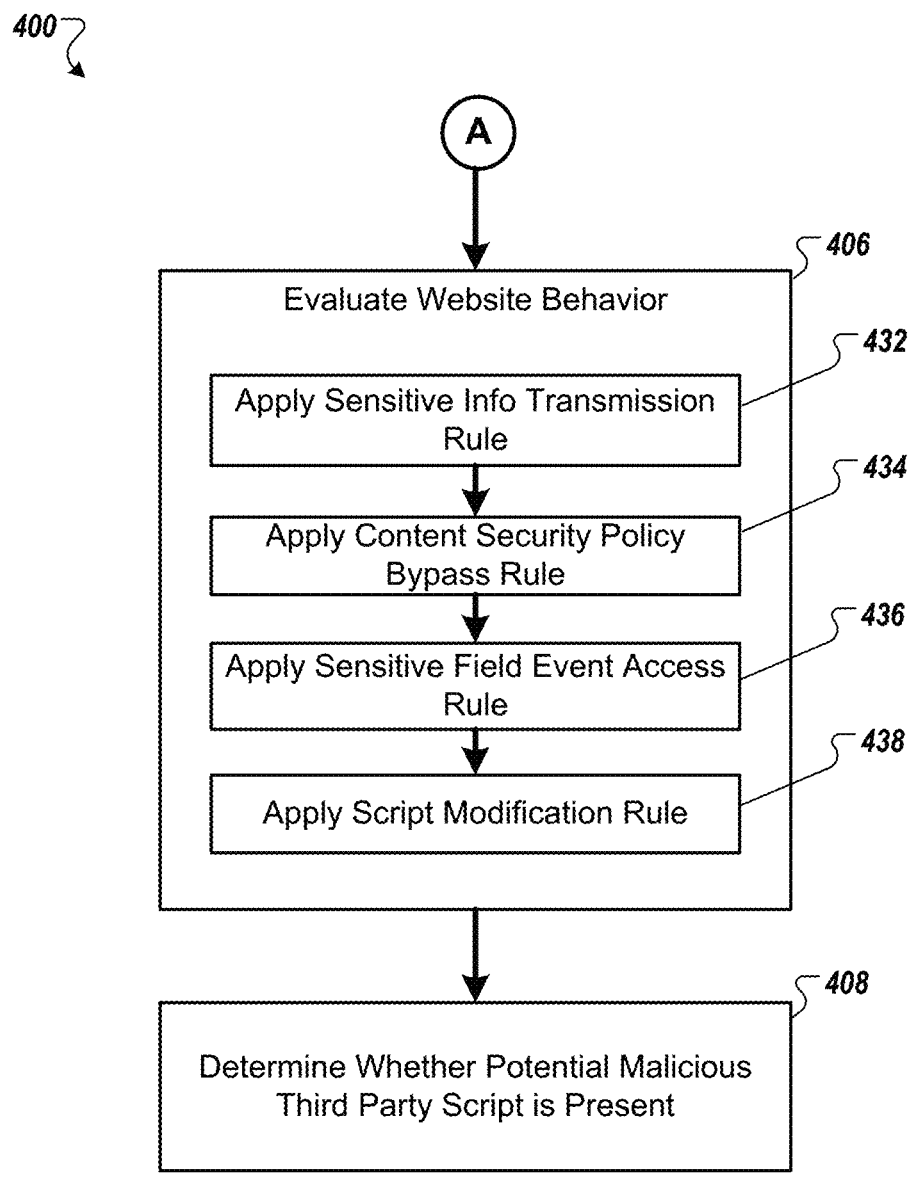

FIGS. 4A-B is a flowchart of an example process 400 for identifying presence of a potentially-malicious script in a website. For example, the process 400 includes evaluating website code (402), evaluating source/destination information (404), evaluating website behavior (406), and determining whether malicious scripts are potentially present in the website (408).

Evaluating website code (402) can be performed by monitoring the website code itself. Evaluating website code (402) can include applying one or more rules against the website code to identify any indicators (e.g., strings, code snippets, etc.) that may represent abnormal, suspicious, or malicious actors (e.g., scripts, domains, etc.). For example, the website code can be evaluated to determine that the website code includes one or more known malicious code snippets, which have been typically shown in known malicious code and designed to hide their behavior, such as heavy obfuscation or malicious code that have been known by digital schemers.

In some implementations, evaluating website code (402) can include applying an encryption rule against the website code (412). For example, the encryption rule includes a rule that looks for presence of particular encryption libraries. The encryption rule can be configured to identify indicators for presence of script-based encryption libraries in the website code. Because a website typically has all the code and traffic encrypted and does not use such encryption libraries, presence of script-based encryption libraries may be a strong indicator of presence of malicious script in the website. In addition or alternatively, the encryption rule can be configured to identify indicators for presence of encryption code in the website code.

In addition or alternatively, evaluating website code (402) can include applying an obfuscation rule against the website code (414). The obfuscation rule can be configured to identify indicators for presence of obfuscation and/or obfuscation type in the website code. Because a website typically has no or little obfuscation code needed, presence of obfuscation may be a strong indicator of presence of malicious code in the website.

In addition or alternatively, evaluating website code (402) can include applying a mask rule against the website code (416). The mask rule can be configured to identify indicators of presence of masks on form fields or other elements that originate from outside the website.

In addition or alternatively, evaluating website code (402) can include applying a sensitive information request rule (418). The sensitive information request rule can be configured to determine whether an outgoing request exists in the website code which attempts to transmit sensitive information to a domain that is outside the website or a domain that is suspicious.

Evaluating the source/destination information (404) can be performed by monitoring network traffic going out and coming into the website. Evaluating the source/destination information (404) can include applying one or more rules against a dynamic behavior log that records the website behavior (e.g., the log 134, 240 herein) to identify any abnormal, suspicious, or malicious network traffic.

In some implementations, evaluating the source/destination information (404) can include applying a known bad actors rule against the website behavior log (e.g., the log 134, 240 herein) (422). The known back actors rule can be configured to search for known bad actors identified in the website behavior log. The known bad actors can include domains that are observed to have been used for malicious activities, or domains that are likely used for particular malicious activities.

In addition or alternatively, evaluating the source/destination information (404) can include applying an unknown actors rule against the website behavior log (e.g., the log 134, 240 herein) (424). The unknown actors rule can be configured to search for unknown actors identified in the website behavior log. The unknown actors can include domains that have never been observed or known in general or by a particular group of security analysts or other users.

Evaluating website behavior (406) can be performed by monitoring website behavior in runtime. Evaluating website behavior (406) can include applying one or more rules against a dynamic behavior log that records the website behavior (e.g., the log 134, 240 herein) to identify any abnormal, suspicious, or malicious behavior of the website.

In some implementations, evaluating website behavior (406) can include applying a sensitive information transmission rule against the website behavior log (e.g., the log 134, 240 herein) (432). The sensitive information transmission rule can be designed to monitor outgoing network traffic and determine if there are requests in the outgoing network traffic that contain sensitive information and are transmitted to a domain that is not the website or otherwise suspicious.

In addition or alternatively, evaluating website behavior (406) can include applying a content security policy bypass rule against the website behavior log (e.g., the log 134, 240 herein) (434). The content security policy bypass rule can be designed to detect an activity or attempt to bypass a security policy executed in a browser and connect to a malicious server.

In addition or alternatively, evaluating website behavior (406) can include applying a sensitive field event access rule against the website behavior log (e.g., the log 134, 240 herein) (436). The sensitive field event access rule can be designed to detect any code that binds to an event (e.g., a checkout button) for fields configured to receive user inputs of sensitive information (e.g., credit card information).

In addition or alternatively, evaluating website behavior (406) can include applying a script modification rule against the website behavior log (e.g., the log 134, 240 herein) (438). The script modification rule can be designed to monitor indicators of script behavior modification in a website when the website is being observed.

Referring still to FIG. 4, when the website code, the source/destination information, and/or the website behavior are evaluated, the process 400 includes determining whether a potentially malicious script (e.g., a third party script) is present (408) based on the evaluation. As described herein, the process 400 can generate an alert (e.g., message) for each of the rules being applied. For example, each of the rules described herein can be applied against static website code or dynamic behavior logs, and if the system determines that the evaluation based on that rule turns out to be positive, the system can generate (e.g., return) an alert (e.g., message) of presence of a potential malicious script in the website. Such an alert can be generated with respect to each of the rules being applied. In addition, for each rule being applied, one or more alerts can be generated depending on the number of positive instances identified based on the rule being applied. In some implementations, the alerts can be aggregated after all or some of the rules that are available have been applied. The number of alerts can be correlated with the likelihood of a malicious script being present in the website. In general, an increasing number of alerts being generated can indicate a more likelihood that a malicious script is present in the website, and further security investigation (by security analysts or by automated systems) may be warranted.

In some implementations, the rules described herein (e.g., in FIGS. 4A-B) can be used all together to evaluate the website security. Alternatively, some of the rules can be selected for desired purposes or according to a desired level of evaluation of a particular website, and only a combination of the selected rules can be applied against the website code and/or the dynamic behavior log created during the test. Alternatively, the rules can be individually and/or selectively applicable for a security test of a particular website.

Figure 5:
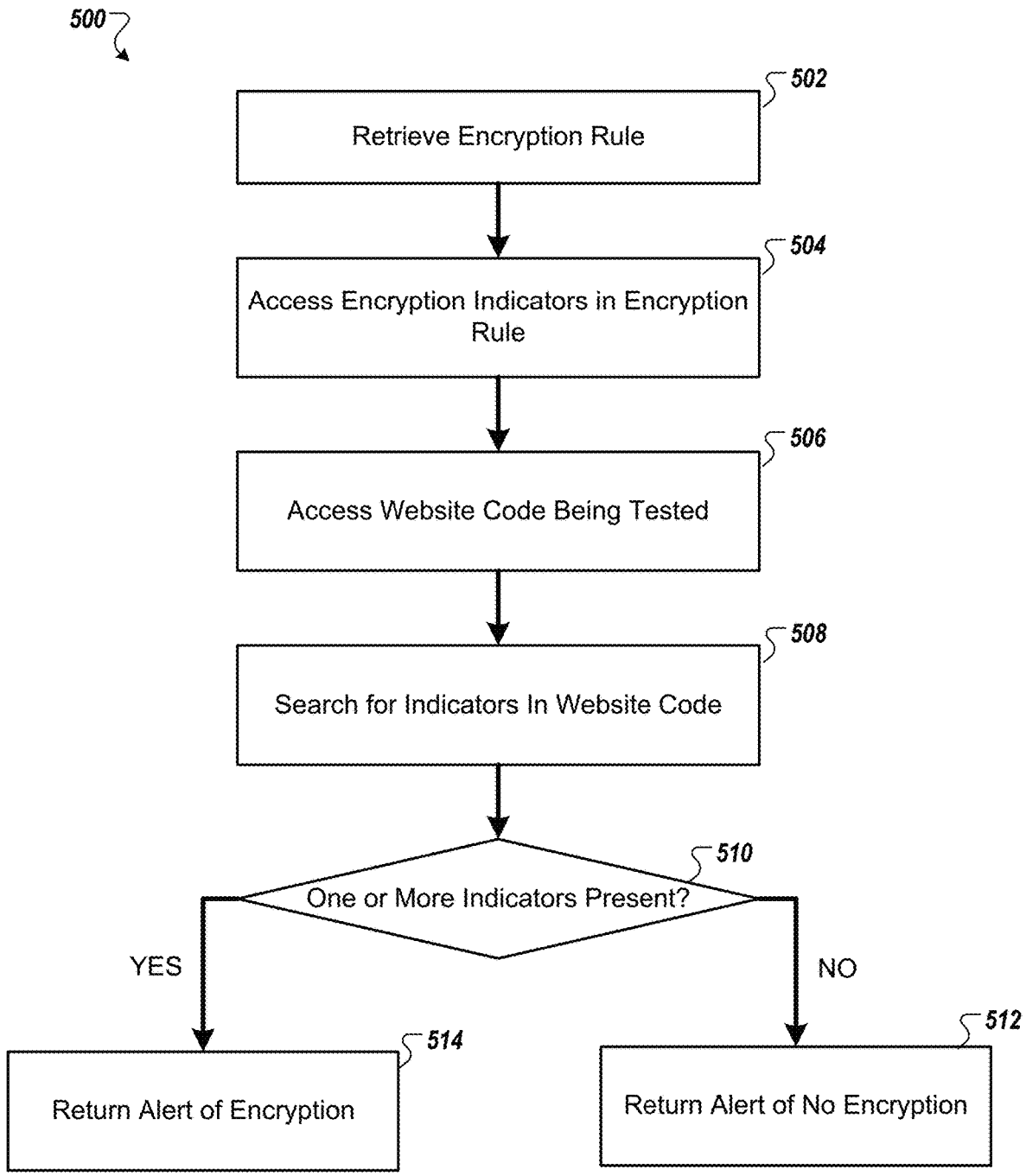
FIG. 5 is a flowchart of an example process for evaluating website code based on an encryption rule.

FIG. 5 is a flowchart of an example process 500 for evaluating website code based on an encryption rule. The process 500 can be used for applying the encryption rule against the website code (412) in FIG. 4. The encryption rule can include a list of strings (e.g., code snippets) that are indicative of presence of encryption. Some schemers encrypt their payloads with encryption libraries (e.g., JavaScript encryption libraries), while the website being targeted does not typically need to use such encryption libraries because it has already encrypted all traffic in and through the website. Therefore, presence of encrypted code with script-based encryption libraries may be a strong indicator of presence of malicious script in the website.

The process 500 can search for a clue of encryption with script-based encryption libraries, instead of the actual payloads. Schemers include JavaScript libraries in the code, and the process 500 looks for them, rather than actual payloads. The clue of encryption can be particular strings or code snippets (e.g., words, phrases, commands, variables, etc.) that would only show up from the encryption libraries. The process 500 is performed against the static code (with all JavaScript files), and does not need to investigate a dynamic behavior log.

Referring to FIG. 5, the process 500 can include retrieving the encryption rule (502), and accessing a list of encryption indicators in the encryption rule (504). The encryption rule can include a list of indicators of encryption, such as a list of strings or code snippets (e.g., words, phrases, commands, variables, etc.), that are associated with script (e.g., JavaScript) encryption libraries. The list of encryption indicators can be created by monitoring and collecting tactics used by schemers that inject malicious scripts in websites.

The process 500 can include accessing code of the website being tested (506). The process 500 is performed against the static code of the website, not a dynamic behavior log (e.g., the log 134, 240). The process 500 can then include searching for indicators (e.g., strings or code snippets) in the code that match the encryption indicators in the encryption rule (508). The process 500 includes determining whether the website code includes one or more strings that match the encryption indicators listed in the encryption rule (510). If no such strings are present ("No" in block 510), the process 500 returns an indicator that represents no encryption or no malicious encryption (512). Alternatively, the process 500 can simply end without returning any indicator, signal, or the like, if there is no such string present. If one or more strings in the website code match any of the encryption indicators in the encryption rule ("Yes" in block 510), the process 500 returns an indicator of encryption for the code (514). The indicator of encryption can be provided in various forms, such as an alert, notification, message, etc., and can be transmitted to one or more security analysts via their computing devices which may be part of the website security testing system 102 (FIG. 1). The indicator of encryption can be aggregated with other indicators described herein, and the aggregate of indicators can be provided to the security analysts via the computing devices or systems, so that the security analysts can perform further investigation.

Figure 6:
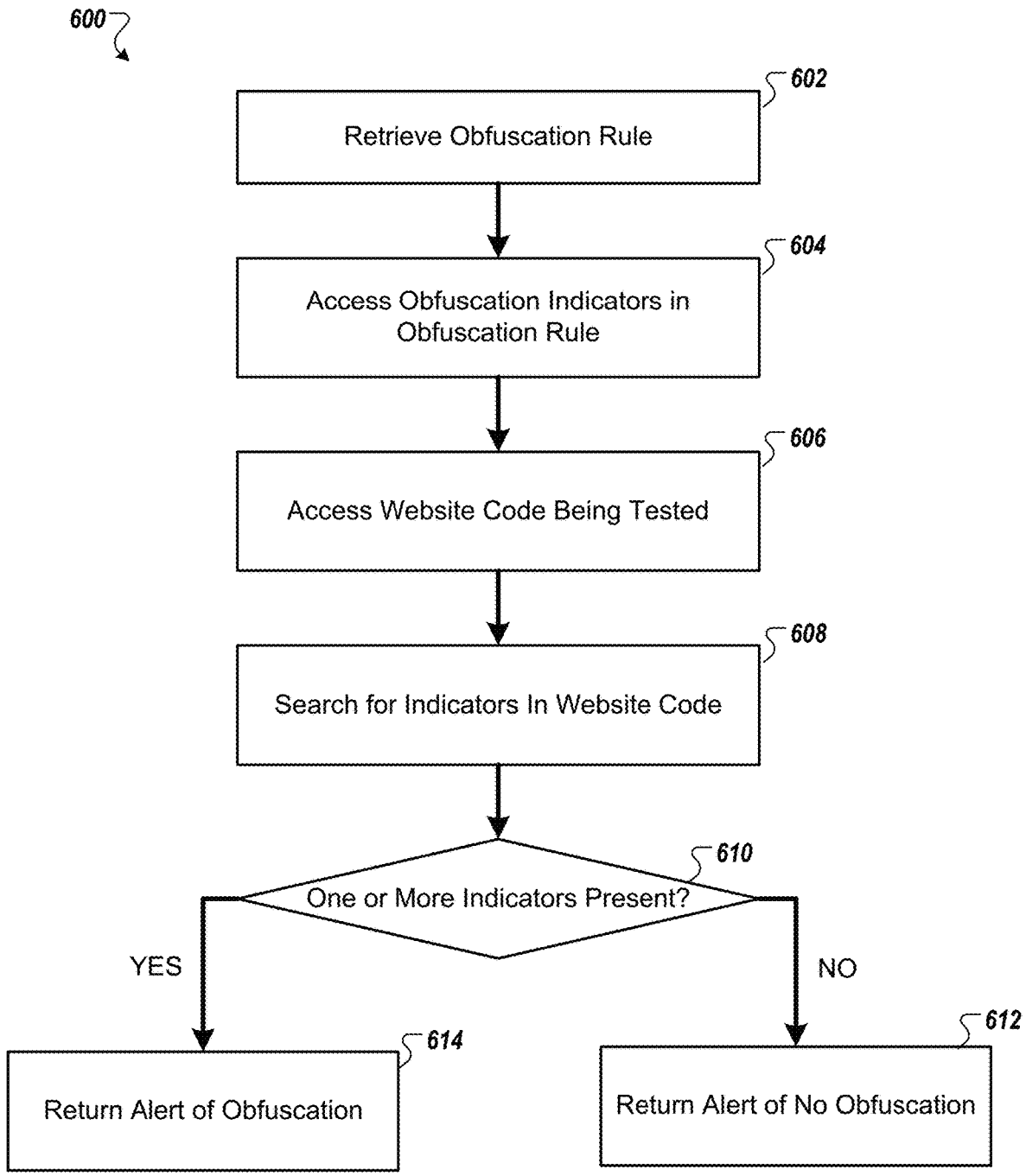
FIG. 6 is a flowchart of an example process for evaluating website code based on an obfuscation rule.

FIG. 6 is a flowchart of an example process 600 for evaluating website code based on an obfuscation rule. The process 600 can be used for applying the obfuscation rule against the website code (414) in FIG. 4. The obfuscation rule can include a list of strings (e.g., code snippets) that are indicative of presence of obfuscation and/or obfuscation type. Some schemers obfuscate their malicious scripts, while the website being targeted typically include no or little obfuscation code. Different types of obfuscation tools convert such malicious code into obfuscated code with particular patterns of strings (e.g., unique variable names, functions, characters, etc.). By way of example, one example obfuscation tool generates abnormal functions calls, a series of particular characters (e.g., "0" and "w"), or an atypical pattern of strings, such as "[four hexadecimal strings].[3 hexadecimal strings]=[function],"<<< >>>," "===[function]," etc. The obfuscation rule can be generated and applied with respect to each of different obfuscation types. Alternatively, the obfuscation rule can be generated and applied with respect to obfuscation in general.

The process 600 can search for indicators of obfuscation types being used in the website code. Such indicators represent presence of obfuscation and/or particular obfuscation type being used. The indicators can be of various types of strings or code snippets, such as words, phrases, symbols, operators, characters, function calls, etc. The indicators can represent a pattern of strings or code snippets that occur in obfuscated code in general, or in a particular type of obfuscation.

Referring to FIG. 6, the process 600 can include retrieving the obfuscation rule (602), and accessing a list of obfuscation indicators in the obfuscation rule (604). The obfuscation rule can include a list of indicators of obfuscation, such as a list of strings or code snippets (e.g., words, phrases, characters, commands, variables, functions, etc.), that typically appear if particular types of obfuscation are used against malicious codes. The list of obfuscation indicators can be created by monitoring and collecting tactics used by schemers that inject malicious scripts in websites.

The process 600 can include accessing code of the website being tested (606). The process 600 is performed against the static code of the website, not a dynamic behavior log (e.g., the log 134, 240). The process 600 can then include searching for strings or code snippets in the code that match the obfuscation indicators in the obfuscation rule (608). The process 600 includes determining whether the website code includes one or more strings that match the obfuscation indicators listed in the obfuscation rule (610). If no such strings are present ("No" in block 610), the process 600 returns an indicator that represents no obfuscation or no malicious obfuscation (612). Alternatively, the process 600 can simply end without returning any indicator, signal, or the like, if there is no such string present. If one or more strings in the website code match any of the obfuscation indicators in the obfuscation rule ("Yes" in block 610), the process 600 returns an indicator of obfuscation for the code (614). The indicator of obfuscation can represent presence of obfuscation in the code. In addition, the indicator of obfuscation can represent a type of obfuscation being used in the code. The indicator of obfuscation can be provided in various forms, such as an alert, notification, message, etc., and can be transmitted to one or more security analysts via their computing devices which may be part of the website security testing system 102 (FIG. 1). The indicator of obfuscation can be aggregated with other indicators described herein, and the aggregate of indicators can be provided to the security analysts via the computing devices or systems, so that the security analysts can perform further investigation.

Figure 7:
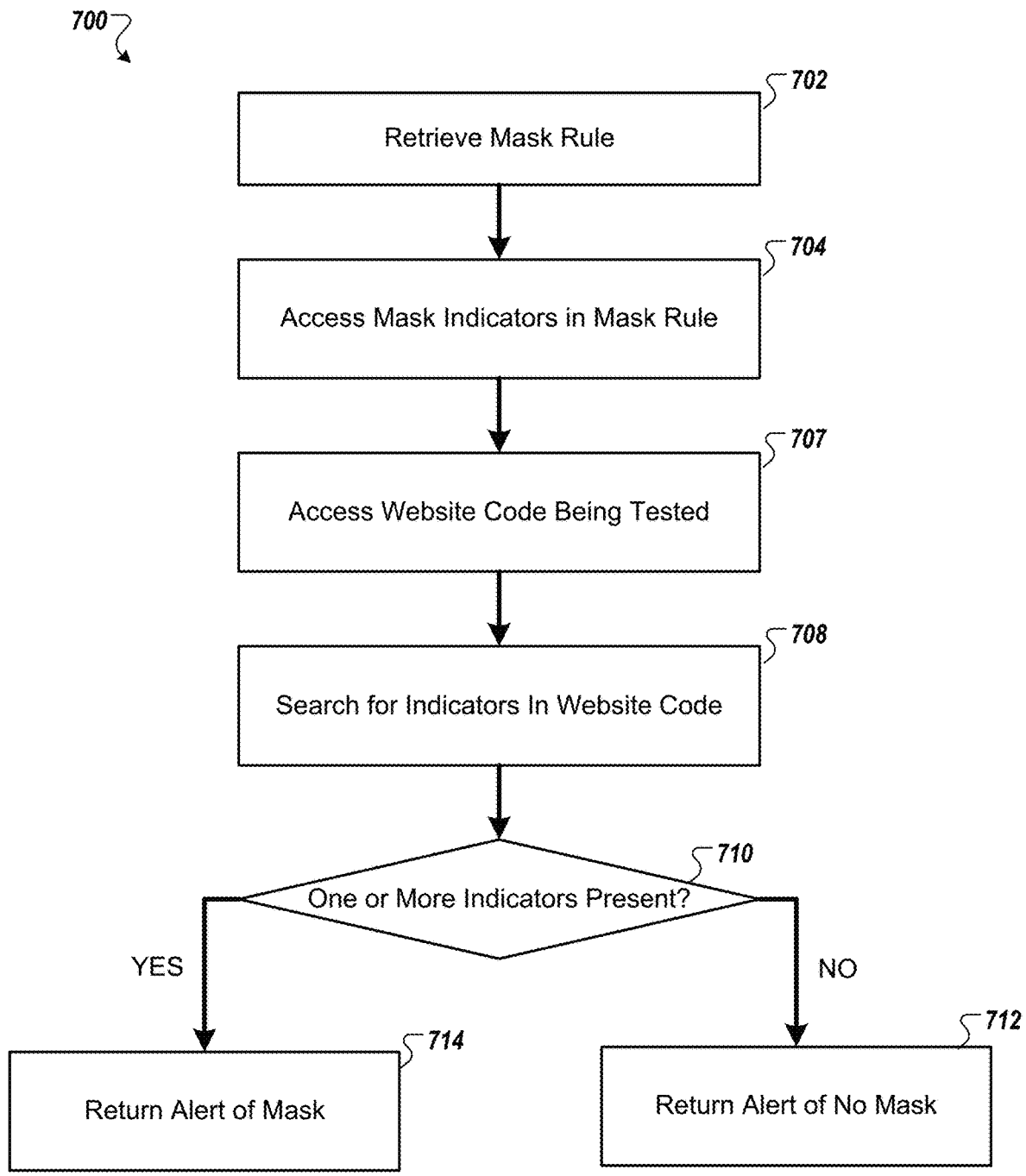
FIG. 7 is a flowchart of an example process for evaluating website code based on a mask rule.

FIG. 7 is a flowchart of an example process 700 for evaluating website code based on a mask rule. The process 700 can be used for applying the mask rule against the website code (416) in FIG. 4. The mask rule can include a list of strings (e.g., code snippets), patterns, and/or other code features that are indicative of presence of masks and/or other code that attempts to bind itself to fields or other elements in the website. Masks can be implemented, for example, by scripts that attempt to access user input provided to website fields and perform operations on the user input, such as modifying it to a standardized format. However, masks and/or other scripts attempting to bind to input fields and other elements in a website can be used by malicious actors to access user input and other sensitive information on a website. One example of a mask script that has been used by malicious actors is a script named "jQuery Mask." The mask rule can be used to identify the presence of scripts that can be used to maliciously use masking techniques.

The process 700 can search for indicators of masks being used in the website code. Such indicators represent presence of masks being used. The indicators can be of various types of strings or code snippets, such as words, phrases, symbols, operators, characters, function calls, etc. The indicators can represent a pattern of strings or code snippets that occur in masks on fields or other elements.

The process 700 can include retrieving the mask rule (702), and accessing a list of mask indicators in the mask rule (704). The mask rule can include a list of indicators of masks, such as a list of strings or code snippets (e.g., words, phrases, characters, commands, variables, functions, etc.), that typically appear if masks are implemented by malicious codes. The list of mask indicators can be created by monitoring and collecting tactics used by schemers that inject malicious scripts in websites.

The process 700 can include accessing code of the website being tested (706). The process 700 is performed against the static code of the website, not a dynamic behavior log (e.g., the log 134, 240). The process 700 can then include searching for strings or code snippets in the code that match the mask indicators in the mask rule (708). The process 700 includes determining whether the website code includes one or more strings that match the mask indicators listed in the mask rule (710). If no such strings are present ("No" in block 710), the process 700 returns an indicator that represents no presence of mask (712). Alternatively, the process 700 can simply end without returning any indicator, signal, or the like, if there is no such string present. If one or more strings in the website code match any of the mask indicators in the obfuscation rule ("Yes" in block 710), the process 700 returns an indicator of presence of mask for the code (714). This indicator can represent presence of mask in the code. The indicator of mask presence can be provided in various forms, such as an alert, notification, message, etc., and can be transmitted to one or more security analysts via their computing devices which may be part of the website security testing system 102 (FIG. 1). The indicator of mask presence can be aggregated with other indicators described herein, and the aggregate of indicators can be provided to the security analysts via the computing devices or systems, so that the security analysts can perform further investigation.

Figure 8:
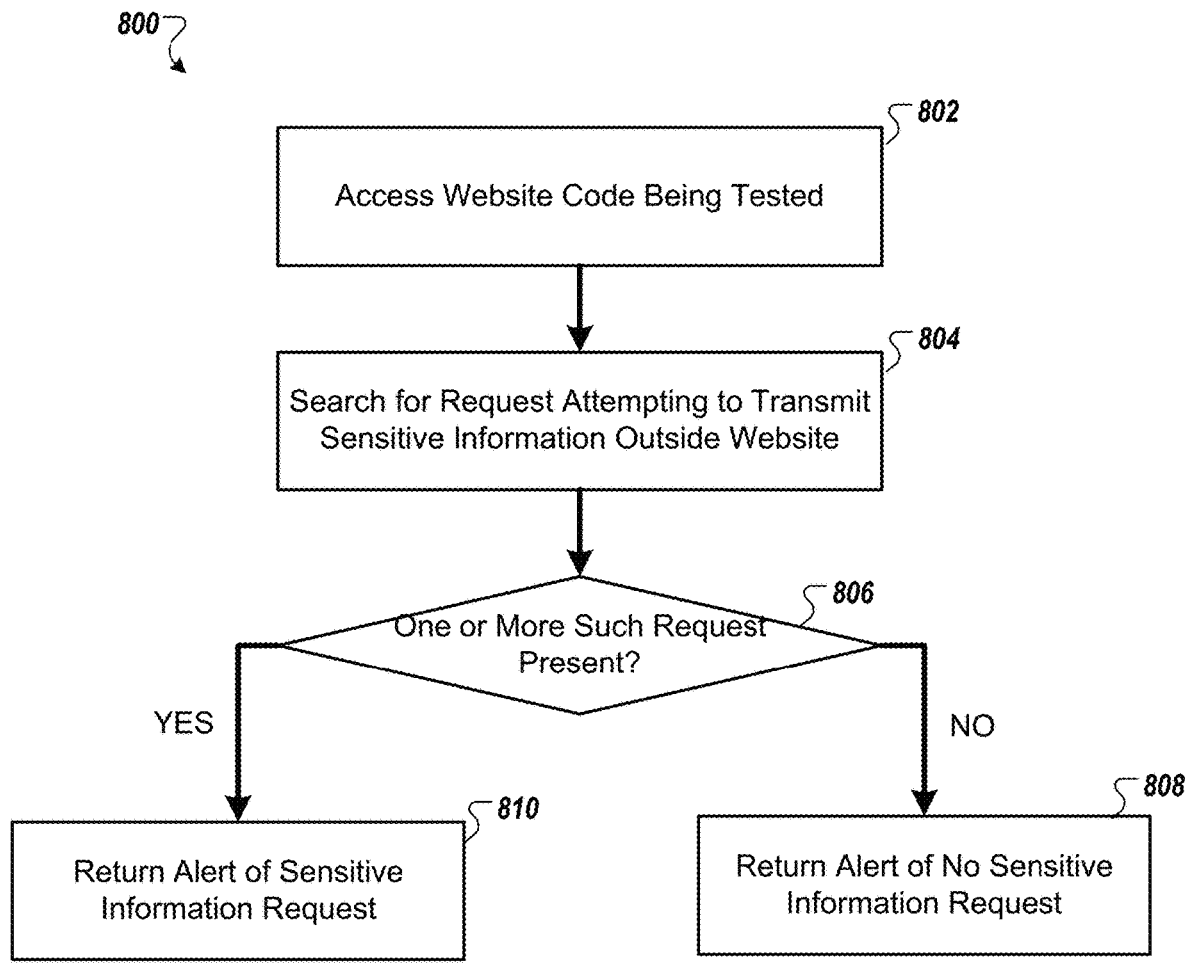
FIG. 8 is flowchart of an example process for evaluating website code based on a sensitive information request rule.

FIG. 8 is flowchart of an example process 800 for evaluating website code based on a sensitive information request rule. The process 800 can be used for applying the sensitive information request rule against the website code (418) in FIG. 4. The sensitive information request rule can be designed to evaluate the website code and determine if an outgoing request exists which attempts to transmit sensitive information to a domain that is outside the website or a domain that is suspicious. Such sensitive information can include login credentials (e.g., username, password, etc.), email addresses, biometric elements, elements for multi-factor authentication, and other sensitive information.

The process 800 can include accessing code of the website being tested (802). In some implementations, the process 800 is performed against the static code of the website. The process 800 can include searching for requests in the code that contain sensitive information (804) and is configured to attempt to transmit the information to a domain outside the website being tested or to a domain that is suspicious. Examples of sensitive information can include login credentials, email addresses, biometric elements, elements for multi-factor authentication, and other sensitive information. The process 800 includes determining whether such requests are present in the website code (806). If no such outgoing request containing sensitive information is found ("No" in block 806), the process 800 returns an indicator that represents no sensitive information request outside the website (808). Alternatively, the process 800 can simply end without returning any indicator, signal, or the like, if there is no such request present. If a request containing sensitive information is found to be transmitted to a domain outside the website or other suspicious domains ("Yes" in block 806), the process 800 returns an indicator of presence of an outgoing request containing sensitive information (810). The indicator of outgoing sensitive information request can be provided in various forms, such as an alert, notification, message, etc., and can be transmitted to one or more security analysts via their computing devices which may be part of the website security testing system 102 (FIG. 1). The indicator of outgoing sensitive information request can be aggregated with other indicators described herein, and the aggregate of indicators can be provided to the security analysts via the computing devices or systems, so that the security analysts can perform further investigation.

Figure 9:
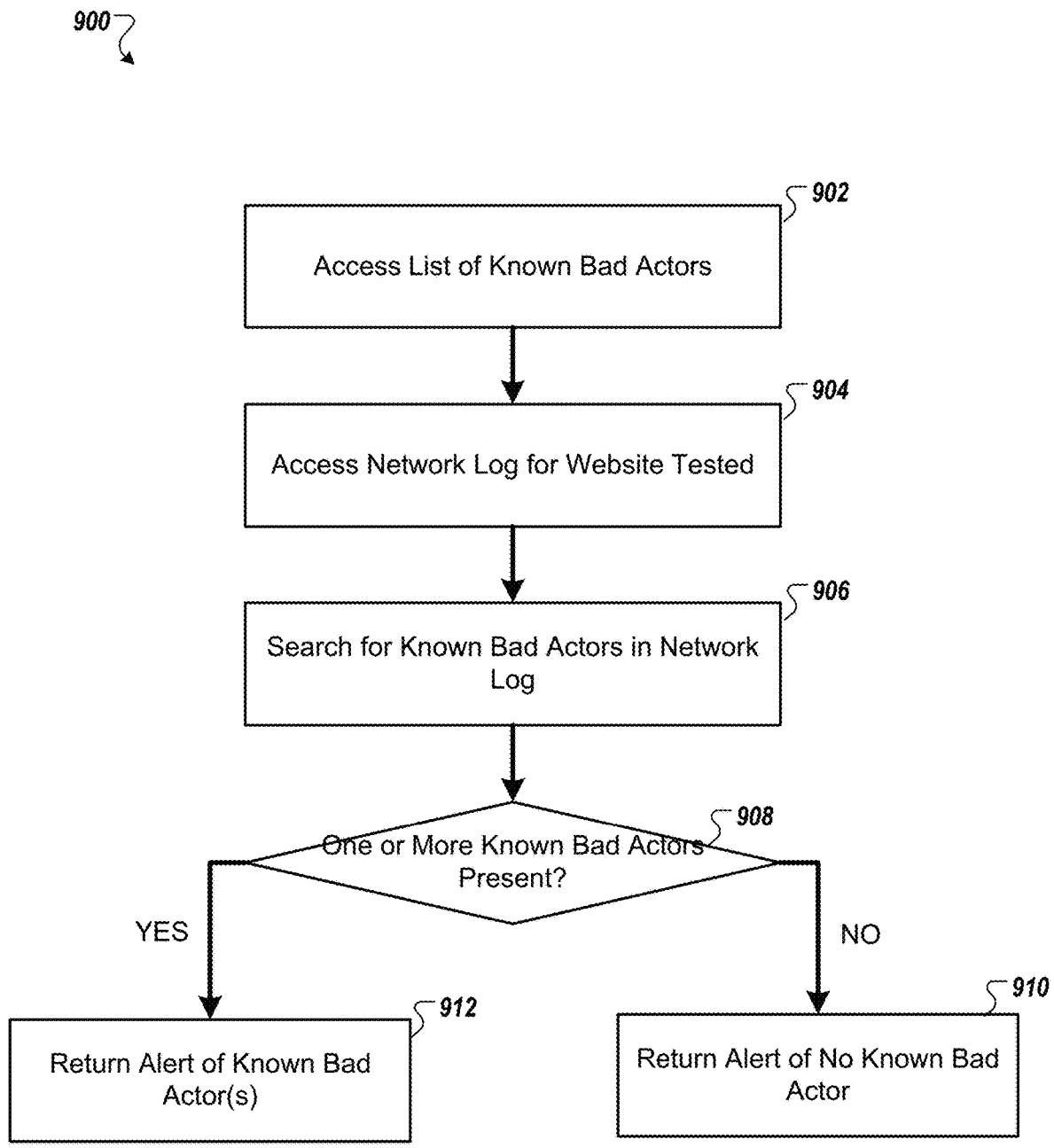
FIG. 9 is a flowchart of an example process for evaluating a website security based on a known bad actors rule.

FIG. 9 is a flowchart of an example process 900 for evaluating a website security based on a known bad actors rule. The process 900 can be used for applying the known bad actors rule against a dynamic behavior log (422) in FIG. 4. The known bad actors rule can include a list of known bad actors, such as domains (URLs). The known bad actors can include domains that are observed to have been used for malicious activities. In addition or alternatively, the known bad actors can include domains that are likely used for particular malicious activities (or used by particular schemers). The known bad actors can be tracked and identified by security analysts or other users using one or more domain tools. The process 900 can monitor inbound and outbound network traffic and detect any traffic to/from one of the list of known bad actors.

The process 900 can include accessing a list of known bad actors (902). The list of known bad actors can be included in the known bad actors rule. The process 900 can include accessing a network log (e.g., the log 134, 240) created during a website testing (904). The website testing can include the testing described with reference to FIGS. 1-3. The process 900 can include searching for one or more known bad actors in the network log (906). For example, searching for one or more known bad actors can include searching for actors in the network log that match ones in the list of known bad actors. The process 900 can include determining whether the known bad actors are present in the network log (908). If no known bad actor is determined to be present in the network log ("No" in block 908), the process 900 returns an indicator of no presence of bad actor (910). Alternatively, the process 900 can simply end without returning any indicator, signal, or the like, if there is no known bad actor present. If a known bad actor is found in the network log ("Yes" in block 908), the process 900 returns an indicator of presence of known bad actor (912). The indicator of known bad actor can be provided in various forms, such as an alert, notification, message, etc., and can be transmitted to one or more security analysts via their computing devices which may be part of the website security testing system 102 (FIG. 1). The indicator of known bad actor can be aggregated with other indicators described herein, and the aggregate of indicators can be provided to the security analysts via the computing devices or systems, so that the security analysts can perform further investigation.

Figure 10:
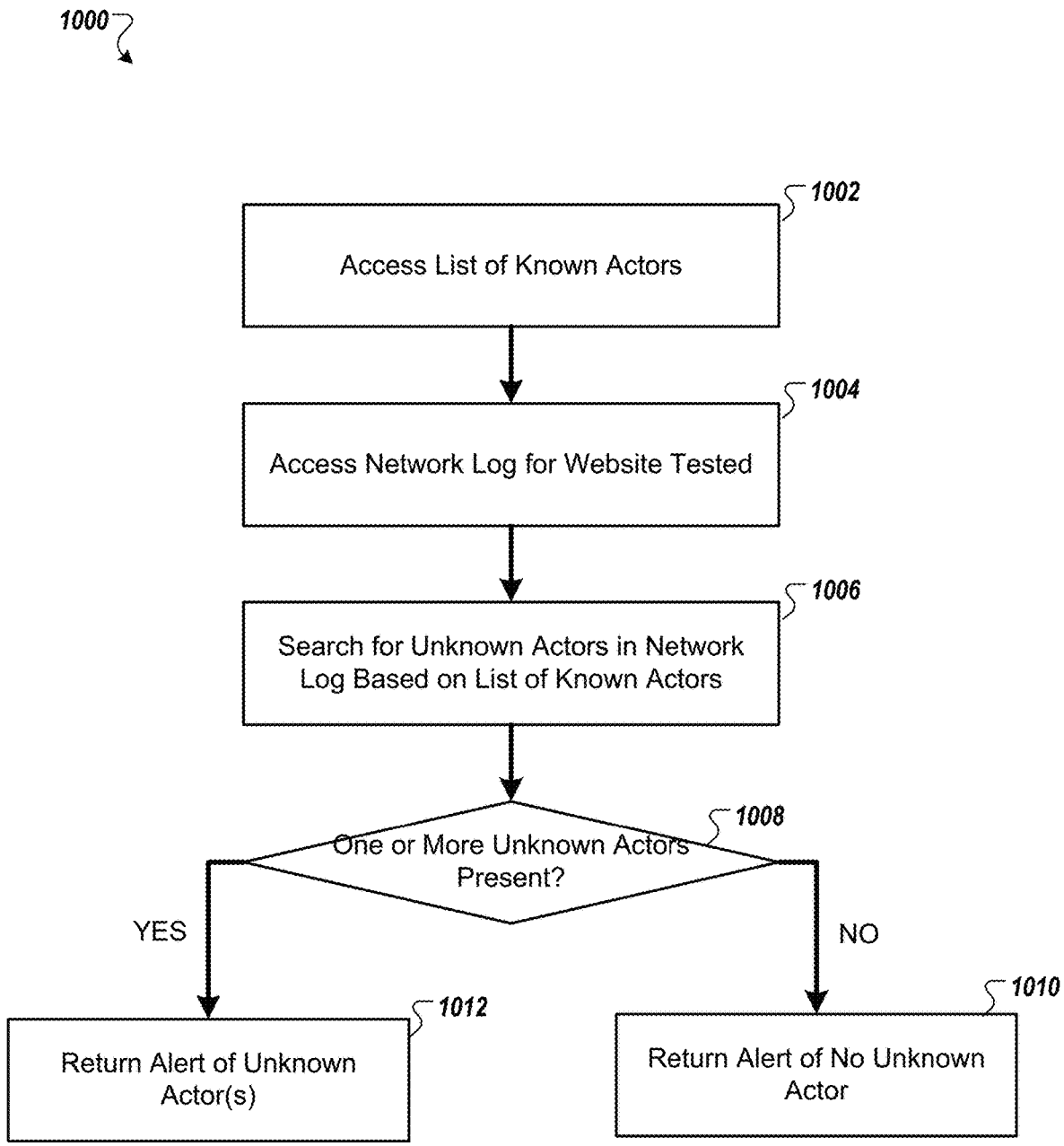
FIG. 10 is a flowchart of an example process for evaluating a website security based on an unknown actors rule.

FIG. 10 is a flowchart of an example process 1000 for evaluating a website security based on an unknown actors rule. The process 1000 can be used for applying the unknown actors rule against a dynamic behavior log (424) in FIG. 4. The unknown actors rule can be designed to determine an actor that is not included in a list of known actors (e.g., domains (URLs)), either malicious or benign. The unknown actors can include domains that have never been observed or known in general or by a particular group of security analysts or other users. Such unknown actors may be associated with either malicious or benign activities. For example, the unknown actors can be actors that are not included in the list of known actors that have been tracked and identified by security analysts or other users using one or more domain tools. The process 1000 can monitor inbound and outbound network traffic and detect any traffic to/from a domain that is not included in the list of known actors. Unknown actors are not necessarily malicious. Therefore, the process 1000 can be used primarily to identify such unknown actors and permit for further investigation on the unknown actors.

The process 1000 can include accessing a list of known actors (1002). The list of known actors can include the list of known bad actors (as described in FIG. 9) and other known actors. The process 1000 can include accessing a network log (e.g., the log 134, 240) created during a website testing (1004). The website testing can include the testing described with reference to FIGS. 1-3. The process 1000 can include searching for one or more unknown actors in the network log (1006). For example, searching for one or more unknown actors can include searching for actors in the network log that are not found in the list of known actors. The process 1000 can include determining whether the unknown actors are present in the network log (1008). If no unknown actor is determined to be present in the network log ("No" in block 1008), the process 1000 returns an indicator of no presence of unknown actor (1010). Alternatively, the process 1000 can simply end without returning any indicator, signal, or the like, if there is no unknown actor present. If an unknown actor is found in the network log ("Yes" in block 1008), the process 1000 returns an indicator of presence of unknown actor (1012). The indicator of unknown actor can be provided in various forms, such as an alert, notification, message, etc., and can be transmitted to one or more security analysts via their computing devices which may be part of the website security testing system 102 (FIG. 1). The indicator of unknown actor can be aggregated with other indicators described herein, and the aggregate of indicators can be provided to the security analysts via the computing devices or systems, so that the security analysts can perform further investigation.

In some implementations, once an unknown actor (e.g., domain) has been identified, the unknown actor is then categorized into a known actor and included in the list of known actors. The known actors that were carried over from unknown actors can be maintained in the list so that the list of known actors keeps growing. Alternatively, the known actors that were categorized from the unknown actors can be periodically purged.

Figure 11:
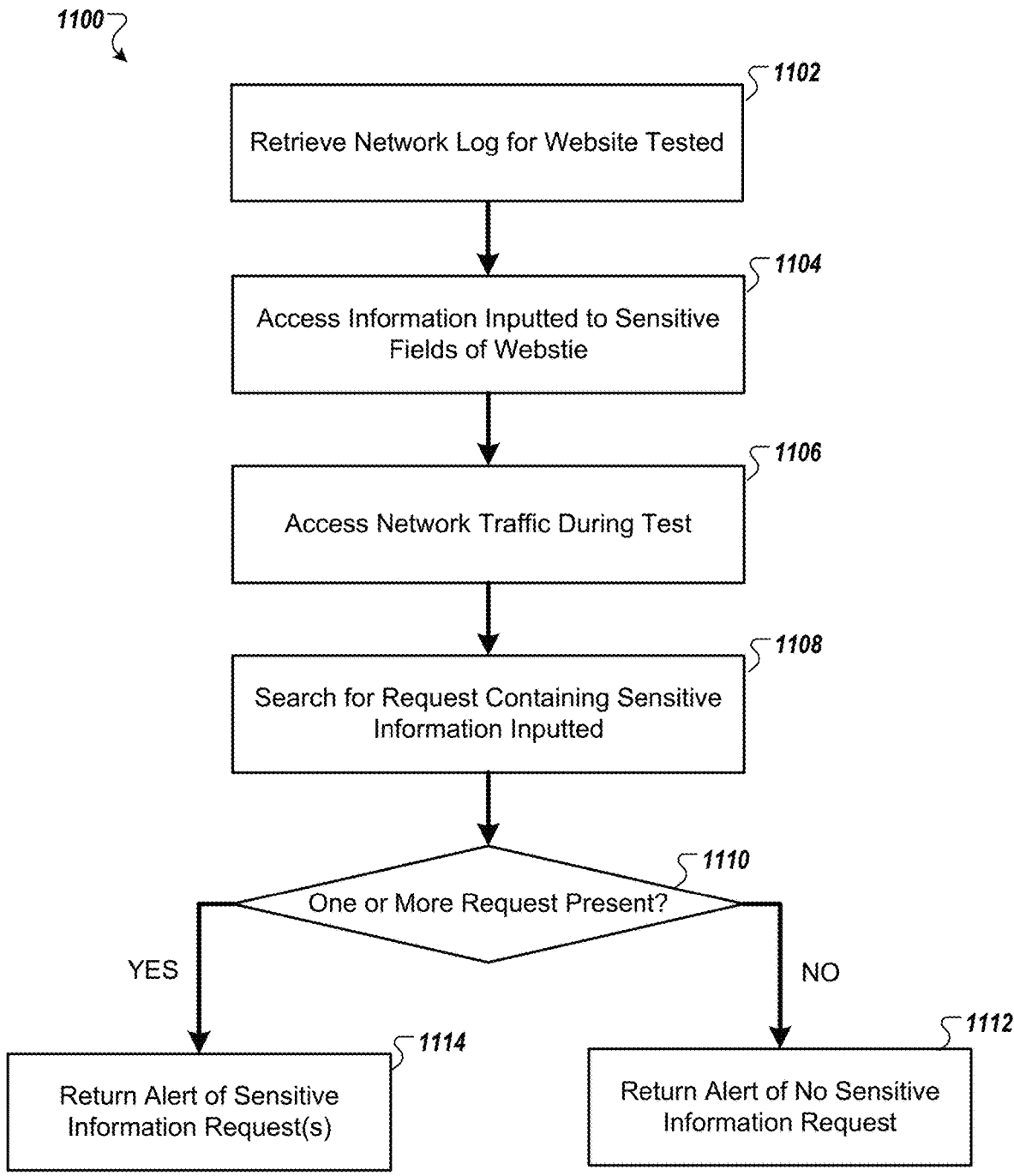
FIG. 11 is flowchart of an example process for evaluating a website security based on a sensitive information transmission rule.

FIG. 11 is flowchart of an example process 1100 for evaluating a website security based on a sensitive information transmission rule. The process 1100 can be used for applying the sensitive information transmission rule against a dynamic behavior log (432) in FIG. 4. The sensitive information transmission rule can be designed to monitor outgoing network traffic and determine if there are requests in the outgoing network traffic that contain sensitive information and are transmitted to a domain that is not the website or otherwise suspicious. For example, the process 1100 can be performed against a dynamic behavior log (e.g., the log 134, 240) to monitor outgoing requests that contain sensitive information and are transmitted to a domain outside the website or other suspicious domains. In some implementations, the sensitive information transmission rule can include a whitelist that categorizes domains to which sensitive information may be safely transmitted. If an outgoing request with sensitive information is transmitted to a domain included in the whitelist, the request is not determined to be malicious. If the outgoing request with sensitive information is transmitted to a domain that is not included in the whitelist, the request can be determined to be malicious and an alert can be generated.

The process 1100 can include retrieving a dynamic behavior log, such as the log 134, 240 (1102). The dynamic behavior log can be created during a website testing, such as the testing described with reference to FIGS. 1-3. The process 1100 can include accessing sensitive information that has been submitted to sensitive fields of the website during the test (1104). The sensitive information for the test can include login credentials submitted to login fields, payment data (e.g., credit card information) submitted to checkout fields or to user profile fields, and other information submitted to sensitive element fields in the website. The process 1100 can include accessing network traffic (e.g., outgoing network traffic) during the test (1106). Such network traffic can be obtained from the dynamic behavior log created during the test. The process 1100 can include searching for the information in the network traffic that matches the sensitive information inputted during the test (1108). The process 1100 can include determining whether any request is present in the network traffic that contains the information that matches the sensitive information inputted during the test (1110). If no request containing the sensitive information is found in the network traffic ("No" in block 1110), the process 1100 returns an indicator of no malicious actor (1112). Alternatively, the process 1100 can simply end without returning any indicator, signal, or the like, if there is no such outgoing request present. If a request containing the sensitive information is found in the network traffic ("Yes" in block 1110), the process 1100 returns an indicator of malicious actor (1114). The indicator of outgoing sensitive information request can be provided in various forms, such as an alert, notification, message, etc., and can be transmitted to one or more security analysts via their computing devices which may be part of the website security testing system 102 (FIG. 1). The indicator of outgoing sensitive information request can be aggregated with other indicators described herein, and the aggregate of indicators can be provided to the security analysts via the computing devices or systems, so that the security analysts can perform further investigation.

Figure 12A:
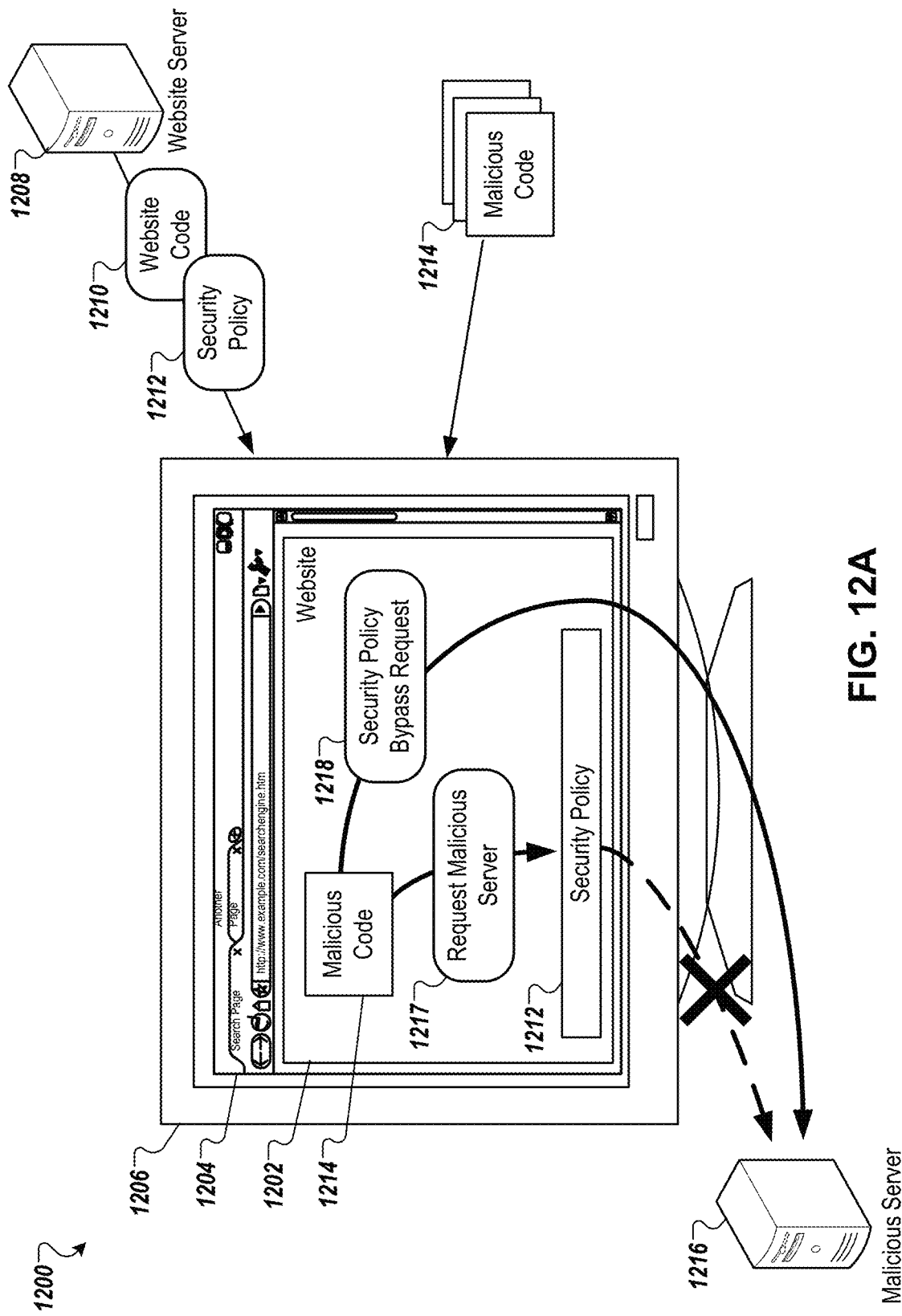
FIG. 12A illustrates an example technique for malicious code to bypass a security policy using a content security policy bypass request.
Figure 12B:
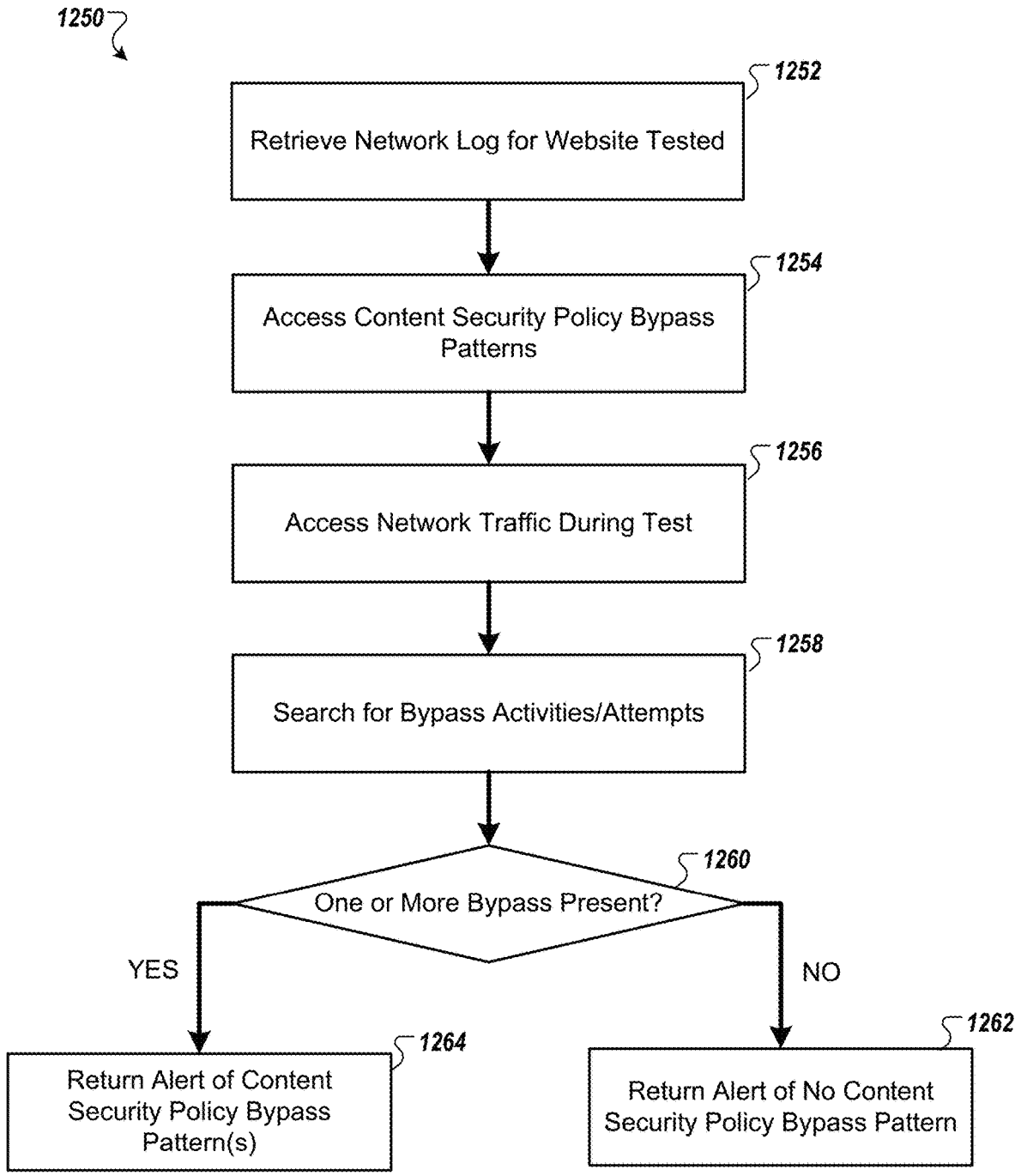
FIG. 12B is a flowchart of an example process for evaluating a website security based on a content security policy bypass rule.

Referring to FIG. 12A-B, an example method for applying a content security policy bypass rule to evaluate a website security. FIG. 12A illustrates an example technique 1200 for malicious code to bypass a security policy. For example, when a user visits a website 1202 using a browser 1204 running on a computing device 1206, a website server 1208 provides website code 1210 and a security policy 1212. The browser 1204 operates to run the website code 1210 to present contents. Further, the browser 1204 can honor and run the security policy 1212 transmitted from the website server 1208. The security policy 1212 can be configured to allow only contents from the website server or particular domains, and preclude the browser 1204 from communicating in network traffic (e.g., with a request for a malicious server 1217) out to domains that are not the website server or the particular domains. As illustrated in FIG. 12A, malicious code 1214 that has been injected into the website can attempt to transmit a request to/from a malicious server 1216. However, the security policy 1212 can prevent such a request from transmitting in network traffic to/from a malicious server.

The malicious code 1214 can attempt to bypass the security policy 1212 to access a malicious server 1216. In some implementations, the malicious code 1214 can use an existing function 1218 to bypass the security policy 1212. In general, the browser can use a function to set up early connections before an HTTP request is actually sent to the server. Connections such as DNS Lookup, TCP Handshake, and TLS negotiation can be initiated beforehand, eliminating roundtrip latency for those connections and saving time for users. Such a function can improve website performance by reducing the amount of round trips and thus optimizing page load times.

FIG. 12B is a flowchart of an example process 1250 for evaluating a website security based on a content security policy bypass rule. The process 1250 can be used for applying the content security policy bypass rule against a dynamic behavior log (434) in FIG. 4. The process 1250 is configured to detect an attempt (including an actual event or activity) to bypass the security policy and connect to a malicious server. In some implementations, the process 1250 detects the functions that have been called or to be called within bypass arguments in the dynamic behavior log. In addition, the process 1250 can detect such bypass requests have been transmitted, or attempted to be transmitted, to/from domains outside whitelisted domains.

The process 1250 can include retrieving a dynamic behavior log, such as the log 134, 240 (1252). The dynamic behavior log can be created during a website testing, such as the testing described with reference to FIGS. 1-3. The process 1250 can include accessing content security policy bypass patterns (1254). The content security policy bypass rule can provide the content security policy bypass patterns that can be used to identify an attempt to bypass a security policy in the website. The content security policy bypass patterns can include bypass activities or attempts that are observed to have been used by schemers to bypass security policies. In addition or alternatively, the bypass patterns can include bypass activities or attempts that are likely used for particular bypass activities to access malicious servers. The content security policy bypass patterns can be identified as functions that have been called or to be called within bypass arguments in dynamic behavior logs. In addition or alternatively, the content security policy bypass patterns can be identified as strings in files. The content security policy bypass patterns can be tracked and identified by security analysts or other users using tools.

In addition, the content security policy bypass patterns can include content security policy bypass activities or attempts that are observed to have been used to access malicious domains. The content security policy bypass rule can provide a whitelist of domains that are not regarded as malicious domains. Therefore, the content security policy bypass patterns can be bypass activities or attempts to access domains that are not included in the whitelist.

The process 1250 can include accessing network traffic (e.g., outbound network traffic) during the test (1256). Such network traffic can be obtained from the dynamic behavior log created during the test. The process 1250 can include searching for activities or attempts to bypass content security policy in the network traffic (1258). The process 1250 can include determining whether any request in the network traffic is a request that matches one of the content security policy bypass patterns (1260). If no request is found to match the content security policy bypass patterns in the network traffic ("No" in block 1260), the process 1250 returns an indicator of no bypass request (1262). Alternatively, the process 1250 can simply end without returning any indicator, signal, or the like, if there is no such request present. If a request is found to match the content security policy bypass patterns in the network traffic ("Yes" in block 1260), the process 1250 returns an indicator of presence of bypass request (1264). The indicator of content security policy bypass request can be provided in various forms, such as an alert, notification, message, etc., and can be transmitted to one or more security analysts via their computing devices which may be part of the website security testing system 102 (FIG. 1). The indicator of content security policy bypass request can be aggregated with other indicators described herein, and the aggregate of indicators can be provided to the security analysts via the computing devices or systems, so that the security analysts can perform further investigation.

Figure 13A:
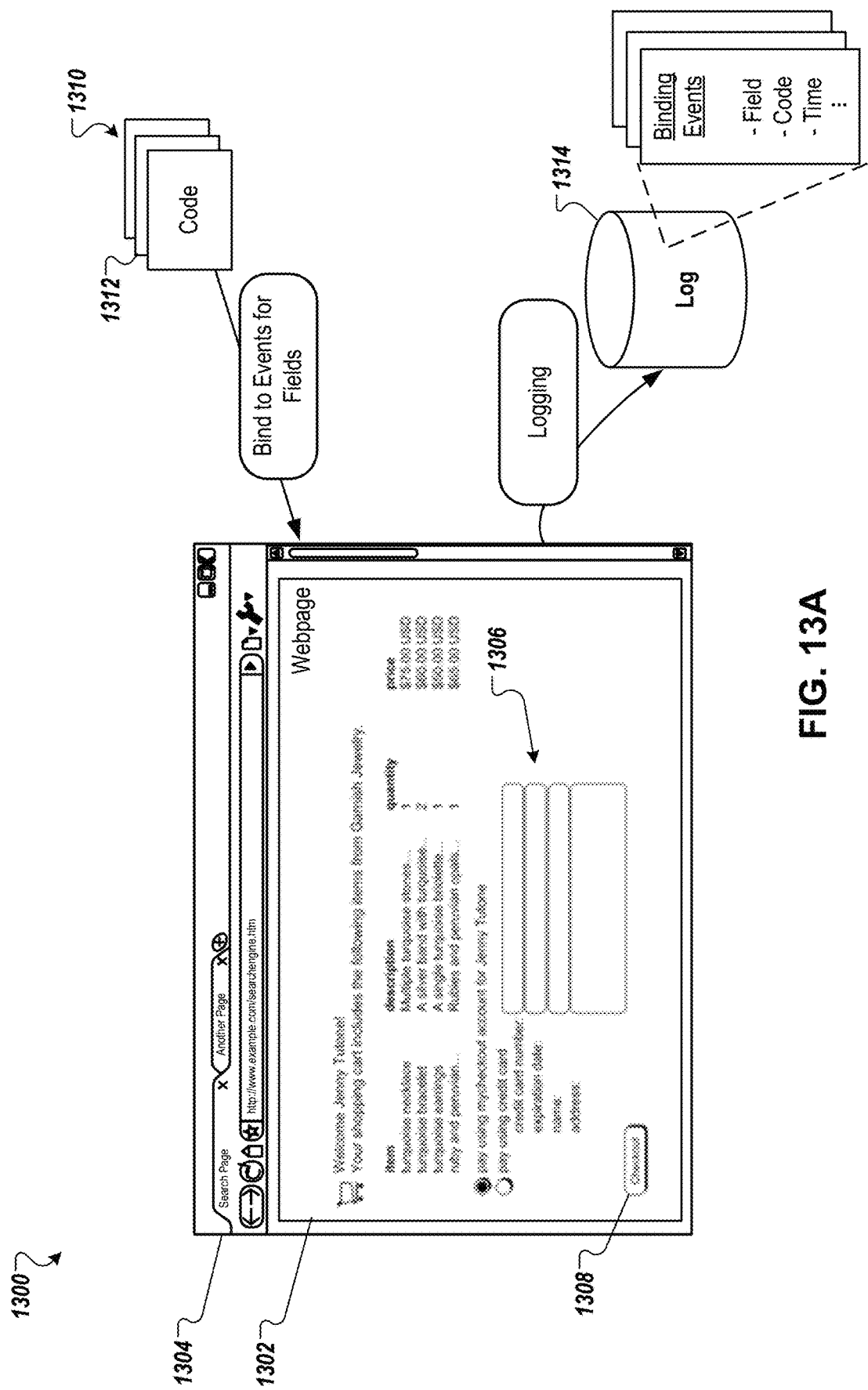
FIG. 13A illustrates an example technique for code to bind events to sensitive information fields in a website.
Figure 13B:
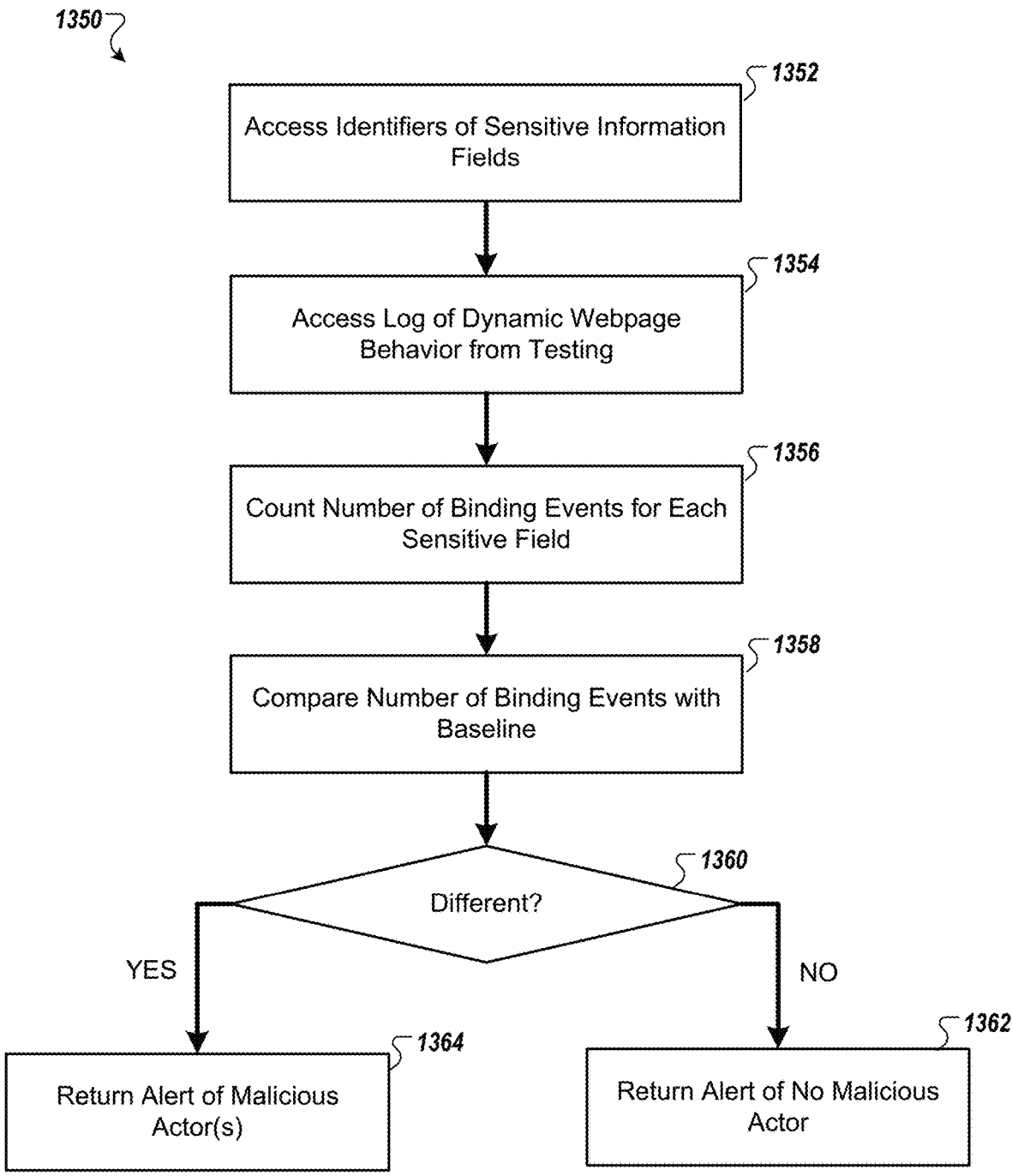
FIG. 13B is a flowchart of an example process for evaluating a website security based on a sensitive field event access rule.
Figure 13C:
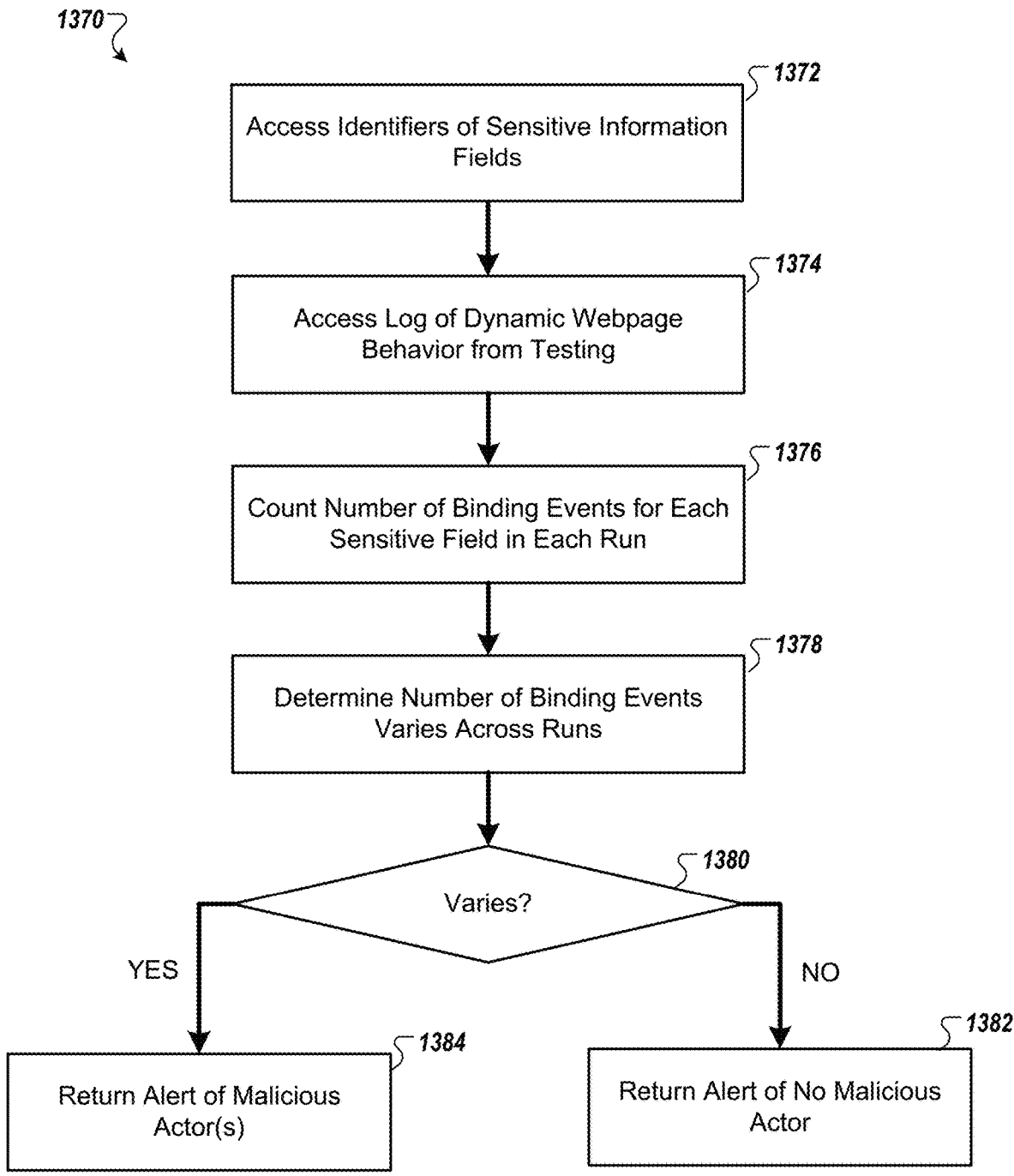
FIG. 13C is a flowchart of an example process for evaluating a website security based on a sensitive field event access rule.

Referring to FIGS. 13A-C, an example method for applying a sensitive field event access rule to evaluate a website security. FIG. 13A illustrates an example technique 1300 for code (e.g., malicious code) to bind events to sensitive information fields in a website. The technique 1300 also illustrates logging the event binding operation in the website. For example, an example webpage 1302 loaded in a browser 1304 can include fields 1306 for receiving a user input of sensitive information. Examples of the webpage 1302 including sensitive information fields 1306 include checkout pages, login pages, user profile pages, and other pages that require user inputs of sensitive information. Examples of sensitive information can include credit card number, expiration, card validation digit (CVD), card pin, card name, address, zip code, etc. The webpage 1302 can further include a button 1308 (e.g., clickable button) for submitting the information filled in the fields 1306.

In some implementations, code 1310 can be run in the webpage 1302 to bind to events to the sensitive information fields 1306. Event binding refers to telling the browser that a particular function should be called when a particular event occurs. Such a particular event may relate to a user input, such as a click on a button. Malicious code 1312 can use such event binding to intercept the user input from the sensitive information fields as the user enters the information to the fields.

Further, when the webpage is tested in runtime, the operation of the code 1310, 1312 can be monitored and logged to a dynamic behavior log 1314. The testing, monitoring, and logging can be performed in the same or similar manner as described with reference to FIGS. 1-3.

FIG. 13B is a flowchart of an example process 1350 for evaluating a website security based on a sensitive field event access rule. The process 1350 can be used for applying the sensitive field event access rule against a dynamic behavior log (436) in FIG. 4. The process 1350 is configured to detect any code that binds to an event (e.g., a checkout button) for fields configured to receive user inputs of sensitive information (e.g., credit card information). For example, digital schemers can steal credit card information or other sensitive information when a user inputs such information and clicks on a checkout button in a checkout page. The process 1350 can determine whether there is code running in the webpage and binding to the user's clicking on the checkout button that has not been observed or known before. As such, the process 1350 can monitor a third-party script that modifies the behavior of the website by adding a dumb click button event and intercepting the user input from the sensitive information fields as the user enters such information in the fields and clicks on the button.

In some implementations, the process 1350 can determine whether there are multiple bindings to events for sensitive information fields. The process 1350 can identify the number of binding events for each sensitive information field in each run. If the number of such event binding events exceeds a threshold value, the website can be considered to include a malicious script and may be further investigated. In addition or alternatively, if the number of the binding events for each field varies across different runs, the website can be investigated to identify what (e.g., domains, scripts, etc.) caused the binding events. In addition or alternatively, if the binding events are identified from various scripts that have not been known, the domains (e.g. URLs) that caused the binding events can be tracked.

Referring to FIG. 13B, the process 1350 can include accessing indicators of sensitive information fields (1352). The process 1350 can include accessing a dynamic behavior log, such as the log 134, 240 (1354). The dynamic behavior log can be created during a website testing, such as the testing described with reference to FIGS. 1-3. The process 1350 can include counting the number of binding events for each sensitive information field (1356), and compare the number of binding events with a baseline value (1358). The process 1350 can include determining whether the number of binding events is different from the baseline value (1360). If the number of binding events is not different from the baseline value ("No" in block 1360), the process 1350 returns an indicator of no presence of malicious actor (1362). Alternatively, the process 1350 can simply end without returning any indicator, signal, or the like, if the number of binding events is not different from the baseline value. If the number of binding events is different from the baseline value ("Yes" in block 1360), the process 1350 returns an indicator of presence of malicious actor (1364). The indicator of presence of malicious actor can be provided in various forms, such as an alert, notification, message, etc., and can be transmitted to one or more security analysts via their computing devices which may be part of the website security testing system 102 (FIG. 1). The indicator of presence of malicious actor can be aggregated with other indicators described herein, and the aggregate of indicators can be provided to the security analysts via the computing devices or systems, so that the security analysts can perform further investigation.

FIG. 13C is a flowchart of an example process 1370 for evaluating a website security based on a sensitive field event access rule. The process 1370 can be used for applying the sensitive field event access rule against a dynamic behavior log (436) in FIG. 4. Similarly to the process 1350, the process 1370 is configured to detect any code that binds to an event (e.g., a checkout button) for fields configured to receive user inputs of sensitive information (e.g., credit card information). For example, the process 1370 can determine whether there are multiple bindings to events for sensitive information fields. The process 1370 can identify the number of binding events for each sensitive information field in each run. If the number of the binding events for each field varies across different runs, the website can be investigated to identify what (e.g., domains, scripts, etc.) caused the binding events. In addition or alternatively, if the binding events are identified from various scripts that have not been known, the domains (e.g. URLs) that caused the binding events can be tracked.

Referring to FIG. 13C, the process 1370 can include accessing indicators of sensitive information fields (1372). The process 1370 can include accessing a dynamic behavior log, such as the log 134, 240 (1374). The dynamic behavior log can be created during a website testing, such as the testing described with reference to FIGS. 1-3. The process 1370 can include counting the number of binding events for each sensitive information field (1376) in each run of the webpage. The process 1370 can include determining whether the number of binding events varies across the runs (1378). If the number of binding events does not vary across the runs ("No" in block 1380), the process 1370 returns an indicator of no presence of malicious actor (1382). Alternatively, the process 1370 can simply end without returning any indicator, signal, or the like, if the number of binding events is not different from the baseline value. If the number of binding events varies across the runs ("Yes" in block 1380), the process 1370 returns an indicator of presence of malicious actor (1384). The indicator of presence of malicious actor can be provided in various forms, such as an alert, notification, message, etc., and can be transmitted to one or more security analysts via their computing devices which may be part of the website security testing system 102 (FIG. 1). The indicator of presence of malicious actor can be aggregated with other indicators described herein, and the aggregate of indicators can be provided to the security analysts via the computing devices or systems, so that the security analysts can perform further investigation.

Figure 14:
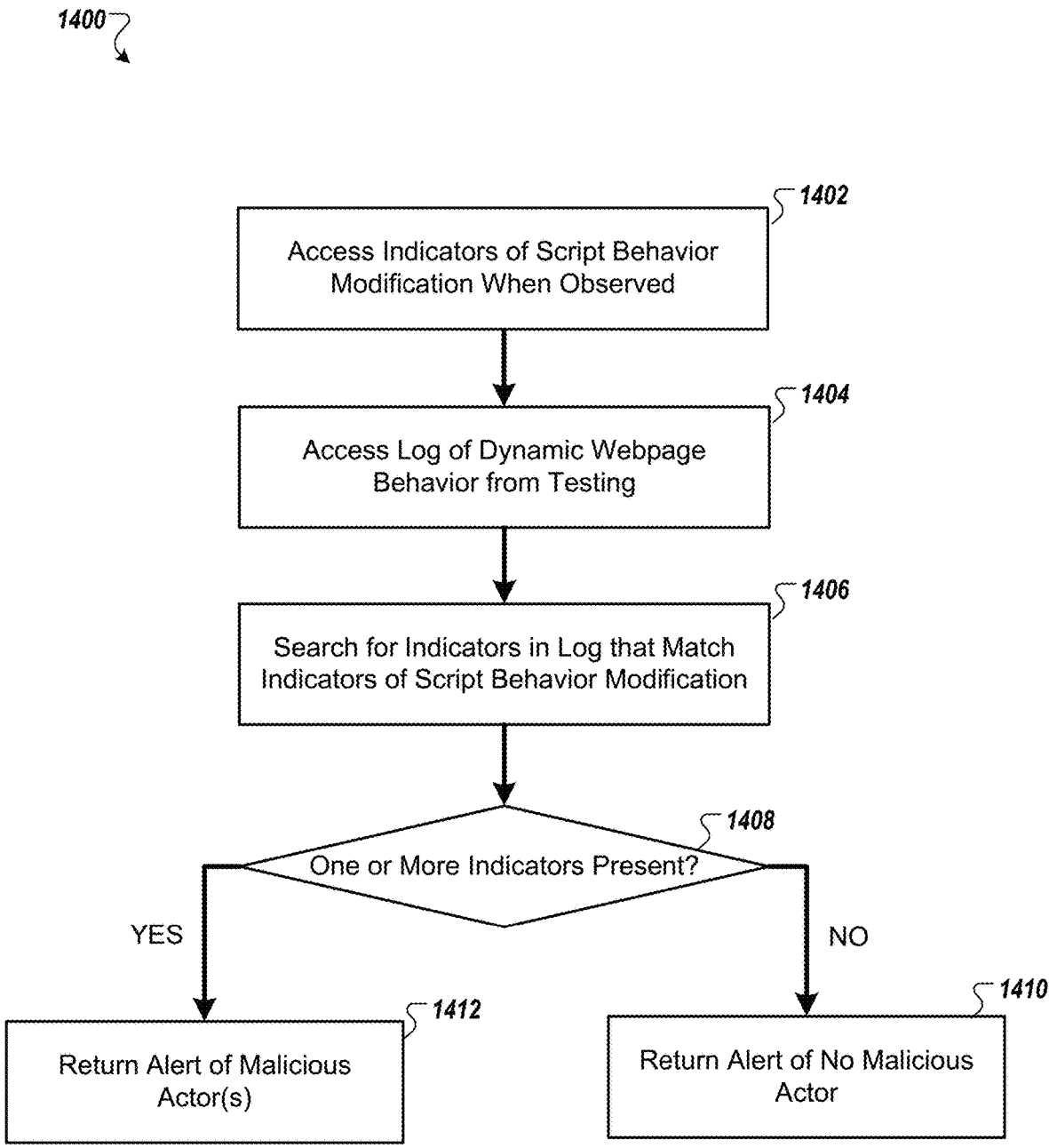
FIG. 14 is a flowchart of an example process for evaluating a website security based on a script modification rule.

FIG. 14 is a flowchart of an example process 1400 for evaluating a website security based on a script modification rule. The process 1400 can be used for applying the script modification rule against a dynamic behavior log (438) in FIG. 4. The script modification rule can be designed to monitor indicators of script behavior modification in a website when the website is being observed.

The process 1400 can include accessing indicators of script behavior modification in a website when the website is being observed (1402). For example, the script modification rule can include the indicators of script behavior modification.

The process 1400 can include accessing a dynamic behavior log, such as the log 134, 240 (1404). The dynamic behavior log can be created during a website testing, such as the testing described with reference to FIGS. 1-3. The process 1400 include searching for indicators in the dynamic behavior log that match the indicators of script behavior modification (1406). The process 1400 can determine whether the matching indicators are present in the dynamic behavior log (1408). If the matching indicators are not present ("No" in block 1408), the process 1400 returns an indicator of no malicious actor (e.g., script) (1410). Alternatively, the process 1400 can simply end without returning any indicator, signal, or the like, if there is no such indicator present. If the matching indicators are present ("Yes" in block 1410), the process 1400 returns an indicator of presence of such matching indicators of script behavior modification (1412). This indicator can be provided in various forms, such as an alert, notification, message, etc., and can be transmitted to one or more security analysts via their computing devices which may be part of the website security testing system 102 (FIG. 1). The indicator can be aggregated with other indicators described herein, and the aggregate of indicators can be provided to the security analysts via the computing devices or systems, so that the security analysts can perform further investigation.

Figure 15:
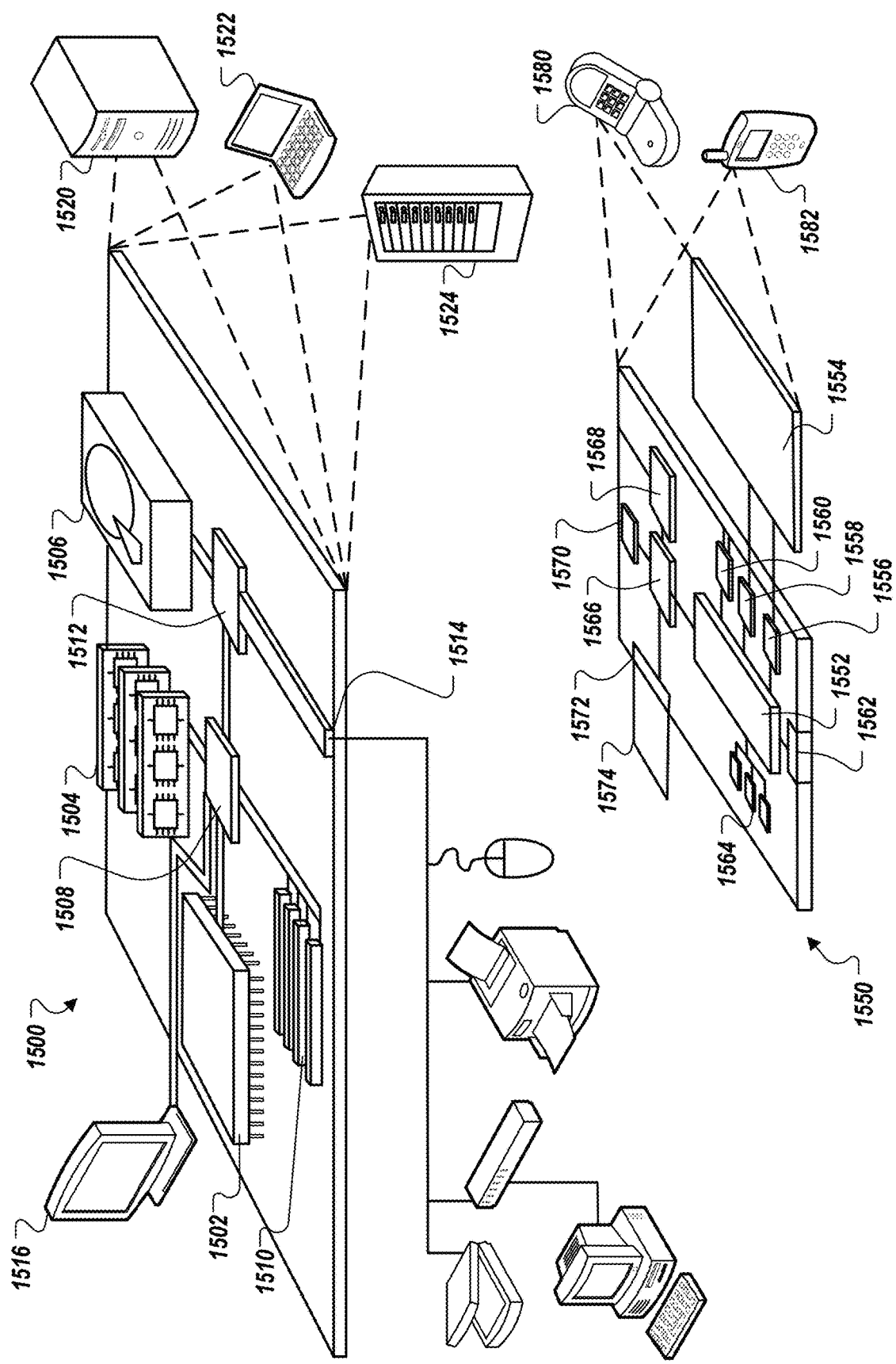
FIG. 15 is a block diagram of computing devices that may be used to implement the systems and methods described in this document.

FIG. 15 is a block diagram of computing devices 1500, 1550 that may be used to implement the systems and methods described in this document, as either a client or as a server or plurality of servers. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high-speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high-speed controller 1508 manages bandwidth-intensive operations for the computing device 1500, while the low speed controller 1512 manages lower bandwidth-intensive operations. Such allocation of functions is an example only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT (Thin-Film-Transistor Liquid Crystal Display) display or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provide in communication with processor 1552, so as to enable near area communication of device 1550 with other devices. External interface 1562 may provided, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provide as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552 that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, WiFi, or other such transceiver (not shown). In addition, GPS (Global Positioning System) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smartphone 1582, personal digital assistant, or other similar mobile device.

Additionally computing device 1500 or 1550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for testing a website anomaly, the method comprising:
   retrieving website code of a website, the website code including a script;
   executing the website code with automation script, the automation script simulating a user interaction with the website;
   monitoring a dynamic behavior of the website including a functional user flow through the website based on a simulated user interaction;
   generating a log of the dynamic behavior;
   applying a set of rules to:
      evaluate the website code including the script;
      evaluate source and destination information in the log of the dynamic behavior; and
      evaluate website behavior in the log of the dynamic behavior; and
   determining presence of a potential malicious script based on the evaluation,
   wherein applying the set of rules comprises:
      applying an encryption rule against the website code;
      applying an obfuscation rule against the website code;
      applying a mask rule against the website code; and
      applying a sensitive information request rule against the website code.

2. The method of claim 1, wherein evaluating source and destination information comprises:
   applying a known bad actors rule against the log of the dynamic behavior; and
   applying an unknown actors rule against the log of the dynamic behavior.

3. The method of claim 1, wherein applying an encryption rule against the website code comprises:
   accessing a list of encryption indicators;
   accessing the website code;
   searching for one or more indicators in the website code that matches any of the encryption indicators in the list; and
   upon determining that at least one indicator is present in the website code that matches any of the encryption indicators in the list, returning an alert of presence of a potential malicious script in the website.

4. The method of claim 1, wherein applying an obfuscation rule against the website code comprises:
accessing a list of obfuscation indicators;
accessing the website code;
searching for one or more indicators in the website code that matches any of the obfuscation indicators in the list; and
upon determining that at least one indicator is present in the website code that matches any of the obfuscation indicators in the list, returning an alert of presence of a potential malicious script in the website.

5. The method of claim 1, wherein applying a mask rule against the website code comprises:
accessing a list of mask indicators;
accessing the website code;
searching for one or more indicators in the website code that matches any of the mask indicators in the list; and
upon determining that at least one indicator is present in the website code that matches any of the mask indicators in the list, returning an alert of presence of a potential malicious script in the website.

6. The method of claim 1, wherein applying a sensitive information request rule against the website code comprises:
accessing the website code;
searching for one or more requests attempting to transmit sensitive information outside the website; and
upon determining that at least one request is present in the website code that attempts to transmit the sensitive information outside the website, returning an alert of presence of a potential malicious script in the website.

7. The method of claim 6, wherein the sensitive information includes at least one of login credentials, email addresses, biometric elements, elements for multi-factor authentication, payment information.

8. The method of claim 2, wherein applying a known bad actors rule against the log of the dynamic behavior comprises:
accessing a list of known bad actors;
accessing the log of the dynamic behavior;
searching for one or more known bad actors in the log; and
upon determining that at least one known bad actor is present in the log, returning an alert of presence of a potential malicious script in the website.

9. A method for testing a website anomaly, the method comprising:
retrieving website code of a website, the website code including a script;
executing the website code with automation script, the automation script simulating a user interaction with the website;
monitoring a dynamic behavior of the website including a functional user flow through the website based on a simulated user interaction;
generating a log of the dynamic behavior;
applying a set of rules to:
evaluate the website code including the script;
evaluate source and destination information in the log of the dynamic behavior; and
evaluate website behavior in the log of the dynamic behavior; and
determining presence of a potential malicious script based on the evaluation, wherein evaluating website behavior comprises:
applying a sensitive information transmission rule against the log of the dynamic behavior;
applying a content security policy bypass rule against the log of the dynamic behavior;
applying a sensitive field event access rule against the log of the dynamic behavior; and
applying a script modification rule against the log of the dynamic behavior.

10. The method of claim 9, wherein applying a sensitive information transmission rule against the log of the dynamic behavior comprises:
accessing the log of the dynamic behavior;
accessing sensitive information inputted to sensitive fields of the website;
accessing network traffic in the log;
searching for one or more requests containing information in the network traffic, the information matching the sensitive information inputted to the sensitive fields; and
upon determining that at least one request is present in the network traffic and contains information that matches the sensitive information, returning an alert of presence of a potential malicious script in the website.

11. The method of claim 9, wherein applying a content security policy bypass rule against the log of the dynamic behavior comprises:
accessing the log of the dynamic behaviors;
accessing content security policy bypass patterns;
accessing network traffic in the log;
searching for one or more activities or attempts for bypassing content security policy in the network traffic that matches any of the content security policy bypass patterns; and
upon determining that at least one activity or attempt for bypassing content security policy is present in the network traffic and matches any of the content security policy bypass patterns, returning an alert of presence of a potential malicious script in the website.

12. The method of claim 9, wherein applying a sensitive field event access rule against the log of the dynamic behavior comprises:
accessing indicators of sensitive information fields;
accessing the log of the dynamic behavior;
determining a number of binding events for each of the sensitive information fields;
determining that the number of binding events is different from a baseline value; and
returning an alert of presence of a potential malicious script in the website.

13. The method of claim 9, wherein applying a sensitive field event access rule against the log of the dynamic behavior comprises:
accessing indicators of sensitive information fields;
accessing the log of the dynamic behavior;
determining a number of binding events for each of the sensitive information fields in each of a plurality of runs of the website;
determining that the number of binding events varies across the plurality of runs of the website; and
returning an alert of presence of a potential malicious script in the website.

14. The method of claim 9, wherein applying a script modification rule against the log of the dynamic behavior comprises:
accessing indicators of script behavior modification when the website is observed;

accessing the log of the dynamic behavior;
searching for one or more indicators in the log that match any of the indicators of script behavior modification; and
upon determining that at least one indicator is present in the log and matches any of the indicators of script behavior modification, returning an alert of presence of a potential malicious script in the website.

15. A method for testing a website anomaly, the method comprising:
retrieving website code of a website, the website code including a script;
executing the website code with automation script, the automation script simulating a user interaction with the website;
monitoring a dynamic behavior of the website including a functional user flow through the website based on a simulated user interaction;
generating a log of the dynamic behavior;
applying a set of rules to:
evaluate the website code including the script;
evaluate source and destination information in the log of the dynamic behavior; and
evaluate website behavior in the log of the dynamic behavior; and
determining presence of a potential malicious script based on the evaluation,
wherein evaluating source and destination information comprises:
applying a known bad actors rule against the log of the dynamic behavior; and
applying an unknown actors rule against the log of the dynamic behavior, and
wherein applying an unknown actors rule against the log of the dynamic behavior comprises:
accessing a list of known actors;
accessing the log of the dynamic behavior;
searching for one or more unknown actors in the log, the unknown actors including actors not included in the list of known actors; and
upon determining that at least one unknown actor is present in the log, returning an alert of presence of a potential malicious script in the website.

16. The method of claim 15, wherein executing the website code comprises:
hooking a plurality of attributes in runtime of the website.

17. The method of claim 16, wherein the plurality of attributes include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic.

18. The method of claim 15, wherein executing the website code comprises:
hooking a plurality of attributes in runtime of the website.

19. The method of claim 18, wherein the plurality of attributes include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic.

* * * * *